US012681285B2

(12) United States Patent
Suzuki

(10) Patent No.: US 12,681,285 B2
(45) Date of Patent: Jul. 14, 2026

(54) SAMPLE OBSERVATION APPARATUS

(71) Applicant: Evident Corporation, Nagano (JP)

(72) Inventor: Yoshimasa Suzuki, Kawasaki (JP)

(73) Assignee: Evident Corporation, Nagano (JP)

( * ) Notice: Subject to any disclaimer, the term of this patent is extended or adjusted under 35 U.S.C. 154(b) by 149 days.

(21) Appl. No.: 18/542,741

(22) Filed: Dec. 17, 2023

(65) Prior Publication Data

US 2024/0118529 A1     Apr. 11, 2024

Related U.S. Application Data

(63) Continuation of application No. 17/149,001, filed on Jan. 14, 2021, now abandoned, which is a
(Continued)

(51) Int. Cl.
*G02B 21/00*        (2006.01)
*G02B 21/08*        (2006.01)
(Continued)

(52) U.S. Cl.
CPC ......... *G02B 21/084* (2013.01); *G02B 21/002* (2013.01); *G02B 21/14* (2013.01); *G02B 21/361* (2013.01)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 4,734,578 A     3/1988   Horikawa
5,621,532 A     4/1997   Ooki et al.
(Continued)

FOREIGN PATENT DOCUMENTS

JP      S61-219919 A      9/1986
JP      H08-160305 A      6/1996
(Continued)

OTHER PUBLICATIONS

International Search Report dated Oct. 23, 2018 issued in PCT/JP2018/026948.
(Continued)

*Primary Examiner* — Thong Q Nguyen
(74) *Attorney, Agent, or Firm* — Scully, Scott, Murphy & Presser, P.C.

(57)        ABSTRACT
A sample observation apparatus includes a light source unit, an illumination optical system, an observation optical system, a light detection element, a scanning unit, a holding member, and an image processing device. A light spot is formed by the illumination optical system. The scanning unit moves the light spot and the holding member relative to each other. A pupil of the observation optical system and the light detection element are positioned at a position conjugate to a pupil position of the illumination optical system. The image processing device generates an image of a sample based on a predetermined image and a filter, and the predetermined image is an image based on a signal output from the light detection element. The filter includes a first region and a second region, and a value in the first region is greater than a value in the second region.

11 Claims, 30 Drawing Sheets

Related U.S. Application Data continuation of application No. PCT/JP2018/026948, filed on Jul. 18, 2018.

(51) Int. Cl.
  *G02B 21/14*     (2006.01)
  *G02B 21/36*     (2006.01)

(58) Field of Classification Search
  CPC ............ G02B 21/0036; G02B 21/0048; G02B
          21/0052; G02B 21/0056; G02B 21/008;
          G02B 21/06; G02B 21/08; G02B 21/084;
          G02B 21/086; G02B 21/10; G02B 21/12;
          G02B 21/125; G02B 21/14; G02B 21/24;
          G02B 21/26; G02B 21/36; G02B 21/361
  USPC .................................................. 359/368–398
  See application file for complete search history.

(56)              References Cited

U.S. PATENT DOCUMENTS

| | | | |
|---|---|---|---|
| 5,751,475 A | | 5/1998 | Ishiwata et al. |
| 5,969,853 A | * | 10/1999 | Takaoka ................. G02B 21/14 |
| | | | 359/371 |
| 6,243,197 B1 | | 6/2001 | Schalz |
| 6,317,261 B1 | | 11/2001 | Otaki |
| 8,094,371 B2 | | 1/2012 | Nishiwaki |
| 9,386,210 B2 | | 7/2016 | Kawashima |
| 9,563,048 B2 | | 2/2017 | Fukutake et al. |
| 2015/0362715 A1 | | 12/2015 | Kubo |
| 2016/0048011 A1 | | 2/2016 | Suzuki et al. |
| 2017/0068083 A1 | | 3/2017 | Hayashi |
| 2018/0188518 A1 | | 7/2018 | Kubo |

FOREIGN PATENT DOCUMENTS

| | | | |
|---|---|---|---|
| JP | 2010-166156 | A | 7/2010 |
| JP | 2016-001227 | A | 1/2016 |
| JP | 5996793 | B2 | 9/2016 |
| JP | 2017-053918 | A | 3/2017 |

OTHER PUBLICATIONS

International Search Report dated Jan. 28, 2021 issued in PCT/JP2018/026948.
Non-Final US Office Action dated Apr. 21, 2023 received in U.S. Appl. No. 17/149,001.
Final US Office Action dated Aug. 18, 2023 received in U.S. Appl. No. 17/149,001.

* cited by examiner $I_{Pa}$    $I_{Pb}$    $I_{Pc}$ $I_{Pa}'$    $I_{Pb}'$    $I_{Pc}'$ $I_{Pa}$          $I_{Pb}$          $I_{Pc}$ $I_{Pa}{}'$          $I_{Pb}{}'$          $I_{Pc}{}'$

BRIGHTNESS

S1  S2  S3

SHIFT AMOUNT OF IMAGE OF IMAGING LIGHT

BRIGHTNESS

SHIFT AMOUNT OF IMAGE OF IMAGING LIGHT

BRIGHTNESS

SHIFT AMOUNT OF IMAGE OF IMAGING LIGHT

SAMPLE OBSERVATION APPARATUS

CROSS-REFERENCE TO RELATED APPLICATION

The present application is a continuation application of U.S. patent application Ser. No. 17/149,001 filed on Jan. 14, 2021, which is a continuation application of International Application No. PCT/JP2018/026948 filed on Jul. 18, 2018, the entire contents of each of which are incorporated herein by reference.

BACKGROUND

Technical Field

The present disclosure relates to an apparatus for observing a sample.

Description of the Related Art

A scanning light microscope disclosed in Japanese Patent Application Laid-open No. S61-219919 is known as an apparatus for observing a sample. The scanning light microscope includes alight source, an objective lens, an optical deflection member, and a photodetector. In the scanning light microscope, light emitted from the light source is incident on the objective lens. At the objective lens, a light spot is formed from incident light. Light emitted from the light source is deflected by the optical deflection member, whereby the light spot moves on a sample.

Light from the sample is incident on the photodetector. The photodetector includes two light-receiving elements. A signal is output from each of the light-receiving elements. A sum signal and a difference signal are obtained from the output two signals. A bright-field image is obtained from the sum signal. A differential phase contrast image signal is obtained from the difference signal. Furthermore, a dark-field image is obtained from the two signals.

In this scanning light microscope, the pupil of the objective lens is filled with light emitted from the light source. In this state, the inside of the field of view is scanned with the light spot. Thus, in this scanning light microscope, consequently, bright-field illumination is performed.

In observation with a conventional light microscope (hereinafter referred to as "microscope"), the entire sample is usually illuminated. As observation with a microscope, bright-field observation, phase-contrast observation, oblique illumination observation, dark-field observation, and inversion contrast observation are known. Inversion contrast observation (hereinafter referred to as "IVC observation") is disclosed in Japanese Patent No. 5996793.

Bright-field observation is often used for observation of a sample having a contrast. Observations other than bright-field observation are often used for observation of a colorless transparent sample. In these observations, it is possible to use an image pickup element. By using an image pickup element, it is possible to acquire a bright-field image, a phase-contrast image, an oblique illumination image, a dark-field image, and an inversion contrast image (hereinafter referred to as "IVC image").

In the scanning light microscope disclosed in Japanese Patent Application Laid-open No. S61-219919, a bright-field image, a differential phase contrast image, and a dark-field image are obtained. These images are obtained in a state in which bright-field illumination is performed.

In a differential phase contrast image, the differential direction is limited to a direction in which light-receiving elements are arranged. To obtain a dark-field image, a black point-like light-shielding object is disposed at a light-collecting position.

In phase-contrast observation, oblique illumination observation, and IVC observation, illumination different from bright-field illumination is used. In these observations, a sample is illuminated in a state in which light emitted from a light source is partially shielded.

SUMMARY

A sample observation apparatus of the present disclosure includes a light source unit, an illumination optical system, an observation optical system, a light detection element, a scanning unit, a holding member, and an image processing device, wherein light emitted from the light source unit is incident on the illumination optical system, a light spot is formed by the illumination optical system, from a position where the light spot is formed, light is incident on the observation optical system, light emerged from the observation optical system is received by the light detection element, the scanning unit moves the light spot and the holding member relative to each other, the light detection element includes a plurality of photoelectric conversion elements arranged in a two-dimensional array, a pupil of the observation optical system and the light detection element are positioned at a position conjugate to a pupil position of the illumination optical system, the image processing device generates an image of a sample based on a predetermined image and a filter, the predetermined image is an image based on a signal output from the light detection element when the sample is placed on the holding member, the filter includes a first region and a second region, and a value in the first region is greater than a value in the second region.

DETAILED DESCRIPTION

Embodiments and examples of a sample observation apparatus according to the present disclosure will be described in detail below based on the drawings. It should be noted that the present disclosure is not limited by these embodiments and examples.

A sample observation apparatus of the present embodiment includes a light source unit, an illumination optical system, an observation optical system, a light detection element, a scanning unit, a holding member, and an image processing device. Light emitted from the light source unit is incident on the illumination optical system. A light spot is formed by the illumination optical system, and from a position where the light spot is formed, light is incident on the observation optical system. Light emerged from the observation optical system is received by the light detection element. The scanning unit moves the light spot and the holding member relative to each other. The light detection element includes a plurality of photoelectric conversion elements arranged in a two-dimensional array. A pupil of the observation optical system and the light detection element are positioned at a position conjugate to a pupil position of the illumination optical system. The image processing device generates an image of a sample based on a predetermined image and a filter, and the predetermined image is an image based on a signal output from the light detection element when the sample is placed on the holding member. The filter includes a first region and a second region, and a value in the first region is greater than a value in the second region.

A specific configuration of the sample observation apparatus of the present embodiment will be described later. In the sample observation apparatus of the present embodiment, it is possible to generate an image by various observation methods. In generation of an image, a signal output from the light detection element is used.

The signal output from the light detection element is obtained by receiving light incident on the observation optical system from the sample with the light detection element. Illumination light with which the sample is irradiated and light incident on the observation optical system from the sample (hereinafter referred to as "imaging light") will now be described.

Figure 1:
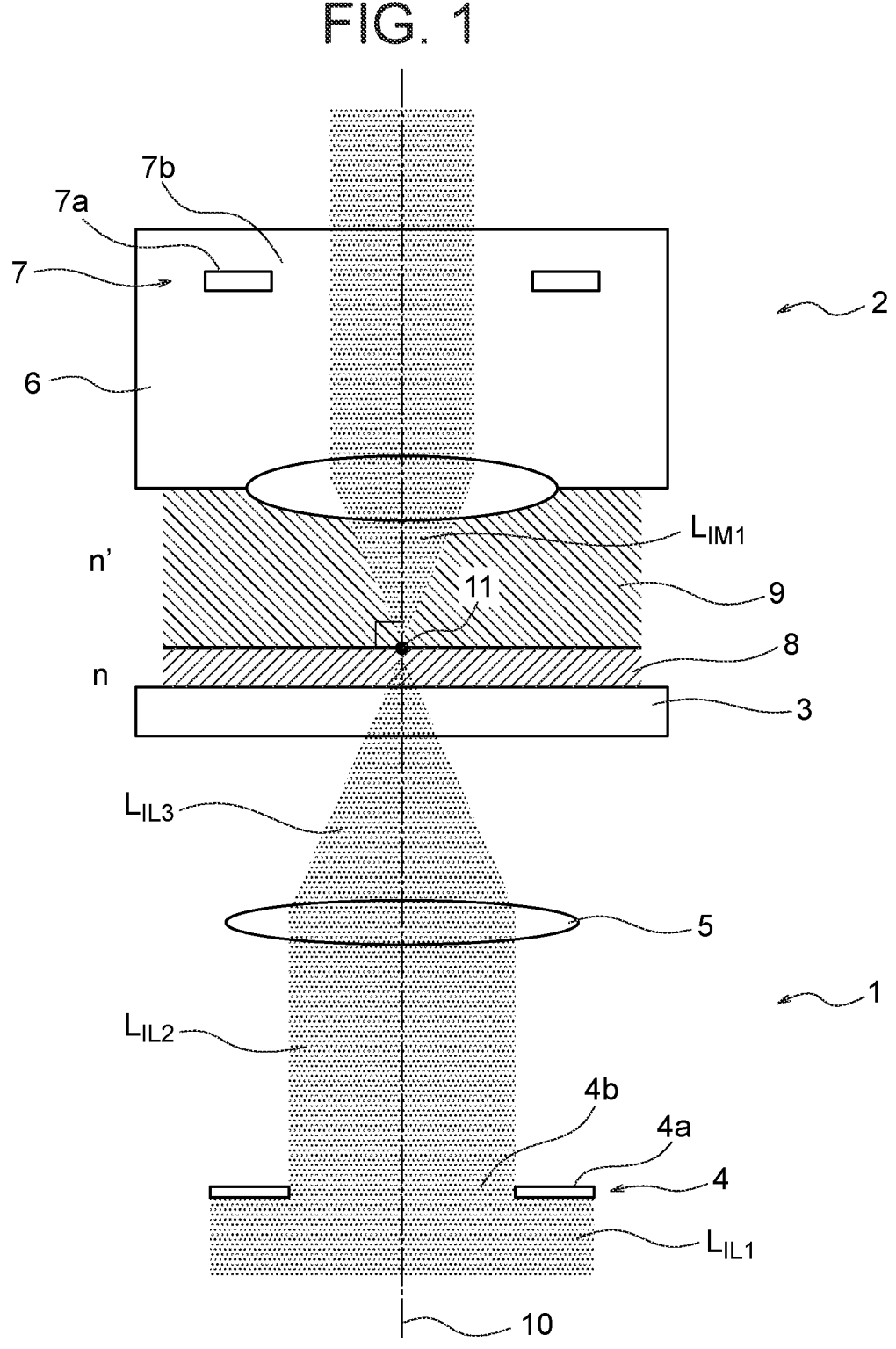
FIG. 1 is a diagram illustrating a state of illumination light and a state of imaging light in a first state.

The relation between illumination light and imaging light in a first state is described. FIG. 1 is a diagram illustrating a state of illumination light and a state of imaging light in the first state. In the first state, the surface of the sample is flat, and the normal to the surface of the sample (hereinafter referred to as "normal to the plane") is parallel to the optical axis.

As illustrated in FIG. 1, an illumination optical system 1 and an observation optical system 2 are disposed to face each other with a stage 3 interposed therebetween. The illumination optical system 1 includes a light-shielding member 4 and a condenser lens 5. The observation optical system 2 includes an objective lens 6. The objective lens 6 includes a diaphragm 7.

For example, a rectangular metal plate is used for the light-shielding member 4. The light-shielding member 4 includes a light-shielding region 4a and a transmission region 4b. The light-shielding region 4a is formed of a metal plate. Nothing is present in the transmission region 4b.

The transmission region 4b is formed at the middle portion of the light-shielding member 4. The light-shielding member 4 is disposed such that the middle portion includes an optical axis 10. Thus, the light-shielding region 4a does not include the optical axis 10, whereas the transmission region 4b includes the optical axis 10.

By the light-shielding member 4 being disposed in an optical path, illumination light $L_{IL1}$ is divided into light shielded by the light-shielding region 4a and light passing through the transmission region 4b. In the illumination light $L_{IL1}$, it is assumed that a distribution of light intensity is uniform in a plane orthogonal to the optical axis.

A transparent plate may be used for the light-shielding member 4. In this case, for example, the light-shielding region 4a is formed by applying a light-shielding coating or affixing a light-shielding member. On the other hand, application of a light-shielding coating or affixation of a light-shielding member is not performed in the transmission region 4b. Thus, only a transparent plate is present in the transmission region 4b.

The diaphragm 7 includes a light-shielding part 7a and a transmission part 7b. For example, a circular metal plate or transparent plate is used for the diaphragm 7. When a metal plate is used for the diaphragm 7, the light-shielding part 7a is a metal plate and the transmission part 7b is a hole formed in the metal plate. When a transparent plate is used for the diaphragm 7, the light-shielding part 7a is formed by applying alight-shielding coating or affixing alight-shielding member. In the transmission part 7b, only the transparent plate is present.

The diaphragm 7 is optically equivalent to the pupil of the objective lens 6. Thus, at the position of the diaphragm 7, a member for restricting passage of a light beam, for example, the metal plate or the transparent plate mentioned above need not to be present.

A sample 8 is placed on the stage 3. The gap between the sample 8 and the objective lens 6 is filled with an immersion medium 9 (hereinafter referred to as "immersion liquid 9"). Here, the sample 8 is a liquid with a refractive index of n, and the immersion liquid 9 is a liquid with a refractive index of n'. Furthermore, n>n'.

The illumination light $L_{IL1}$ is a parallel light beam and formed such that the optical axis 10 is included in the light beam. The illumination light $L_{IL1}$ travels through the optical path of the illumination optical system 1 toward the sample 8. The light-shielding member 4 and the condenser lens 5 are disposed in the optical path of the illumination optical system 1.

The illumination light $L_{IL1}$ is divided into light shielded by the light-shielding region 4a and light passing through the transmission region 4b. The light-shielding member 4 is disposed such that the transmission region 4b includes the optical axis 10. Therefore, the optical axis 10 is not included in the light-shielding region 4a. When passing through the transmission region 4b, the region of illumination light $L_{IL2}$ is formed into a circular shape.

The position of the light-shielding member 4 is conjugate to the position of the diaphragm 7 by the condenser lens 5 and the objective lens 6.

The illumination light $L_{IL2}$ passing through the transmission region 4b is incident on the condenser lens 5. The illumination light $L_{IL2}$ incident on the condenser lens 5 is collected by the condenser lens 5. Illumination light $L_{IL3}$ is emerged from the condenser lens 5. The illumination light $L_{IL3}$ is incident on an observation point 11 on the sample 8. Hence, the observation point 11 is illuminated.

The illumination light $L_{IL3}$ is transmitted through the sample 8. As described above, in the first state, the normal to the plane is parallel to the optical axis. In a state in which the normal to the plane is parallel to the optical axis, the surface of the sample is not inclined. When the surface of the sample is not inclined, a light ray traveling on the optical axis 10 of the illumination light $L_{IL3}$ (hereinafter "central ray $L_{ILC}$") is not refracted by the surface of the sample 8.

Light emerged from the sample 8 (hereinafter referred to as "imaging light $L_{IM1}$") reaches the objective lens 6. The imaging light $L_{IM1}$ reaching the objective lens 6 is all incident on the objective lens 6. The imaging light $L_{IM1}$ incident on the objective lens 6 passes through the diaphragm 7 without being shielded by the light-shielding part 7a.

Figure 2:
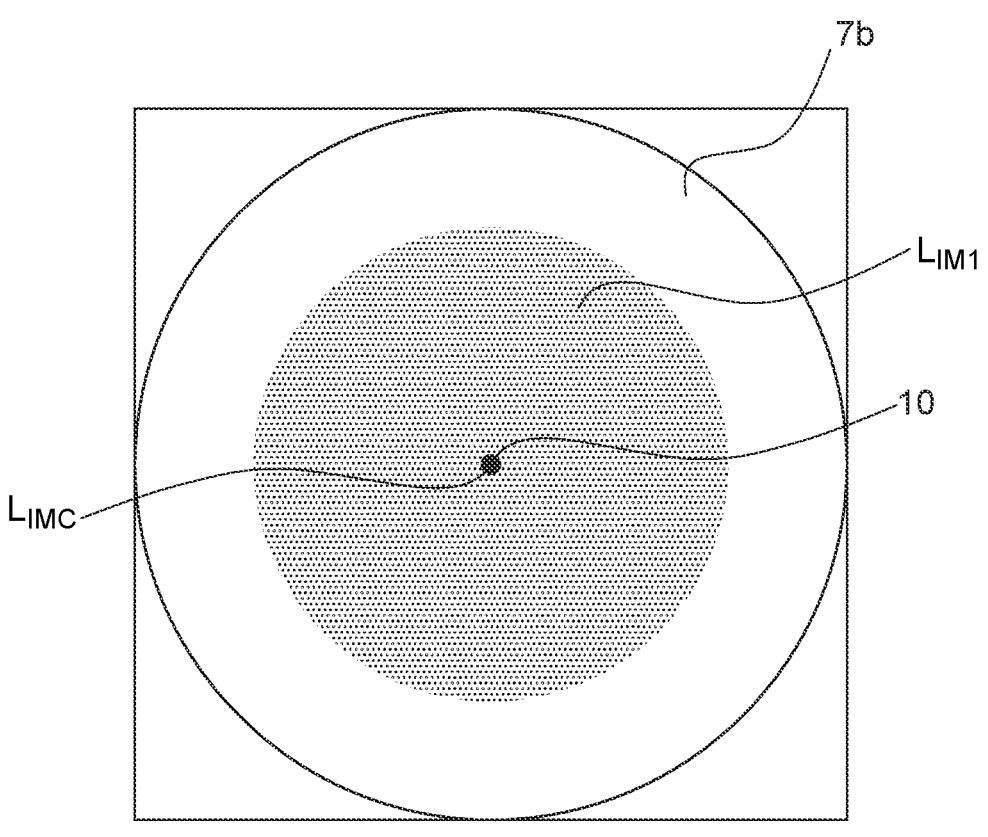
FIG. 2 is a diagram illustrating a state of imaging light in the first state.

FIG. 2 is a diagram illustrating a state of imaging light in the first state. As illustrated in FIG. 2, the area of the imaging light $L_{IM1}$ is smaller than the area of the transmission part 7b. The imaging light $L_{IM1}$ is positioned inside the transmission part 7b.

Furthermore, in the first state, the surface of the sample 8 is not inclined. In this case, the central ray $L_{ILC}$ is not refracted by the surface of the sample 8. Therefore, a light ray (hereinafter referred to as "central ray $L_{IMC}$") corresponding to the central ray $L_{ILC}$ of the imaging light $L_{IM1}$ also travels on the optical axis 10. When the central ray $L_{IMC}$ is considered as the center of the imaging light $L_{IM1}$, in the first state, the center of the imaging light $L_{IM1}$ is coincident with the optical axis 10.

FIG. 2 is a diagram illustrating a state when the imaging light $L_{IM1}$ is captured. In the capture of the imaging light $L_{IM1}$, for example, the light detection element is disposed at the position of the diaphragm 7. The light detection element may be disposed at a position conjugate to the position of the diaphragm 7.

The diaphragm 7 is optically equivalent to the pupil of the objective lens 6. Thus, the light detection element is disposed at the pupil position of the objective lens 6. Further, the position of the light-shielding member 4 is conjugate to the position of the diaphragm 7 by the condenser lens 5 and the objective lens 6. Thus, the light detection element is disposed at a position conjugate to the pupil position of the condenser lens 5.

The light detection element includes a plurality of photoelectric conversion elements. A plurality of photoelectric conversion elements are arranged in a two-dimensional array. For example, a CCD image sensor or a CMOS image sensor is used for the light detection element.

The quadrangular frame in FIG. 2 indicates an image pickup region. In FIG. 2, the image pickup region is square but is not necessarily square. For example, the image pickup region may be rectangular. Furthermore, in FIG. 2, the outer edge of the transmission part 7b is inscribed in the image pickup region. However, the outer edge of the transmission part 7b may intersect the image pickup region or may be positioned outside the image pickup region.

In capturing the imaging light, a range wider than the imaging light is captured. Thus, an image obtained by capturing includes an image of the imaging light (hereinafter referred to as "image $I_{Light}$") and an image other than the imaging light (hereinafter referred to as "image $I_{Out}$"). Light does not exist around the imaging light. Thus, the brightness of the image $I_{Out}$ becomes darker than the brightness of the image $I_{Light}$. However, in FIG. 2, the imaging light $L_{IM1}$ is depicted as being darker for the sake of visibility.

Figure 3:
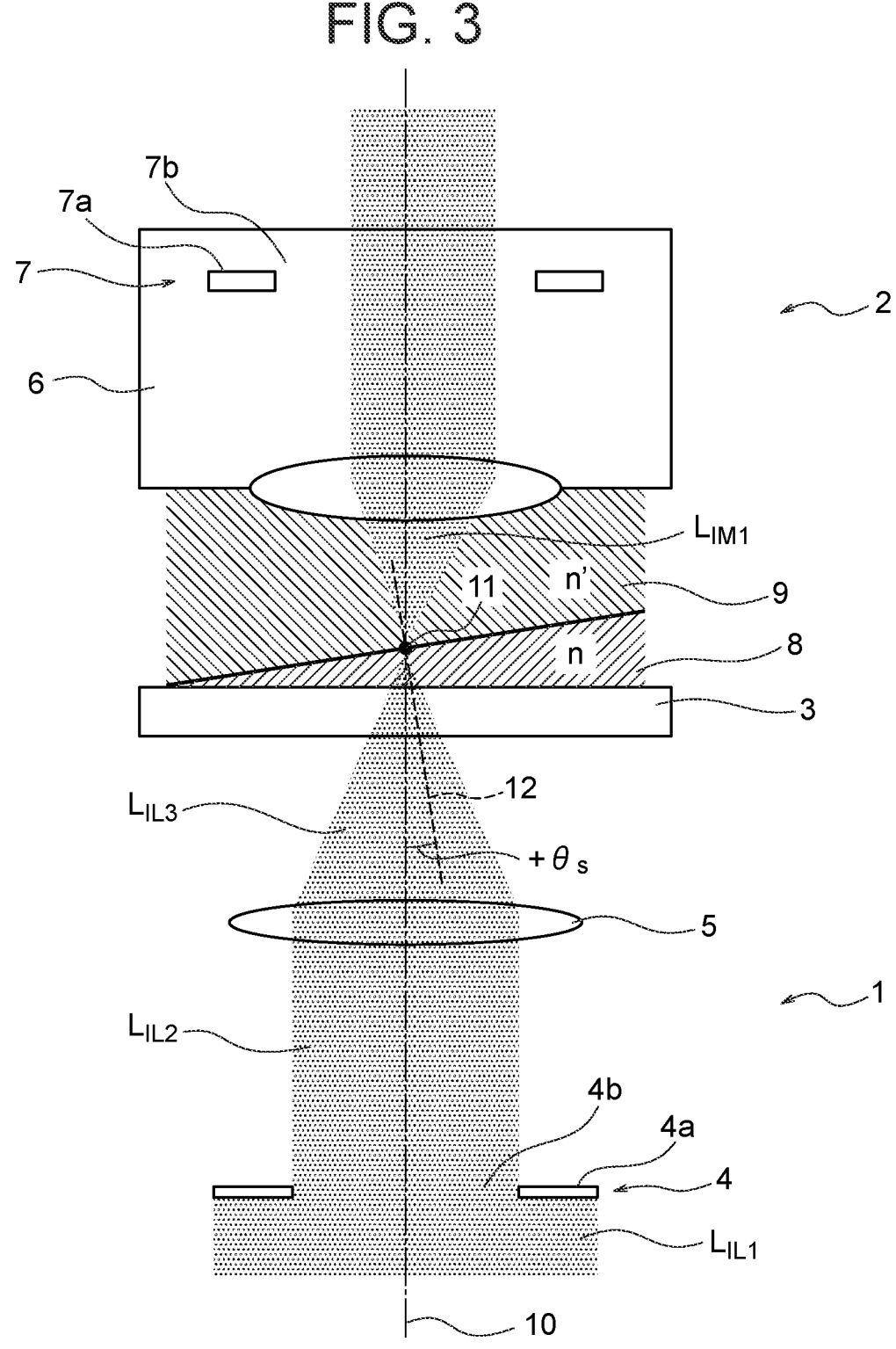
FIG. 3 is a diagram illustrating a state of illumination light and a state of imaging light in a second state.

Next, the relation between illumination light and imaging light in a second state is described. FIG. 3 is a diagram illustrating a state of illumination light and a state of imaging light in the second state. In the second state, the surface of the sample is flat, but the normal to the plane is nonparallel to the optical axis.

As illustrated in FIG. 3, since the angle between a normal 12 to the plane and the optical axis 10 is $\theta_s$, the surface of the sample 8 is inclined by the inclination angle $\theta_s$. The sign of the angle is positive when the normal 12 to the plane is positioned in the counterclockwise direction with respect to the optical axis 10 and is negative when the normal 12 to the plane is positioned in the clockwise direction. In the second state, $\theta_s$ has a positive value.

In the second state, illumination is performed in the same manner as in the first state. The illumination light $L_{IL3}$ is incident on the observation point 11 on the sample 8. Hence, the observation point 11 is illuminated.

The illumination light $L_{IL3}$ is transmitted through the sample 8. As described above, in the second state, the normal to the plane is nonparallel to the optical axis. In a state in which the normal to the plane is nonparallel to the optical axis, the surface of the sample is inclined. When the surface of the sample is inclined, the central ray $L_{ILC}$ is refracted by the surface of the sample 8.

The imaging light $L_{IM1}$ emerged from the sample 8 reaches the objective lens 6. The imaging light $L_{IM1}$ reaching the objective lens 6 is all incident on the objective lens 6.

The imaging light $L_{IM1}$ incident on the objective lens 6 passes through the diaphragm 7 without being shielded by the light-shielding part 7a.

Figure 4:
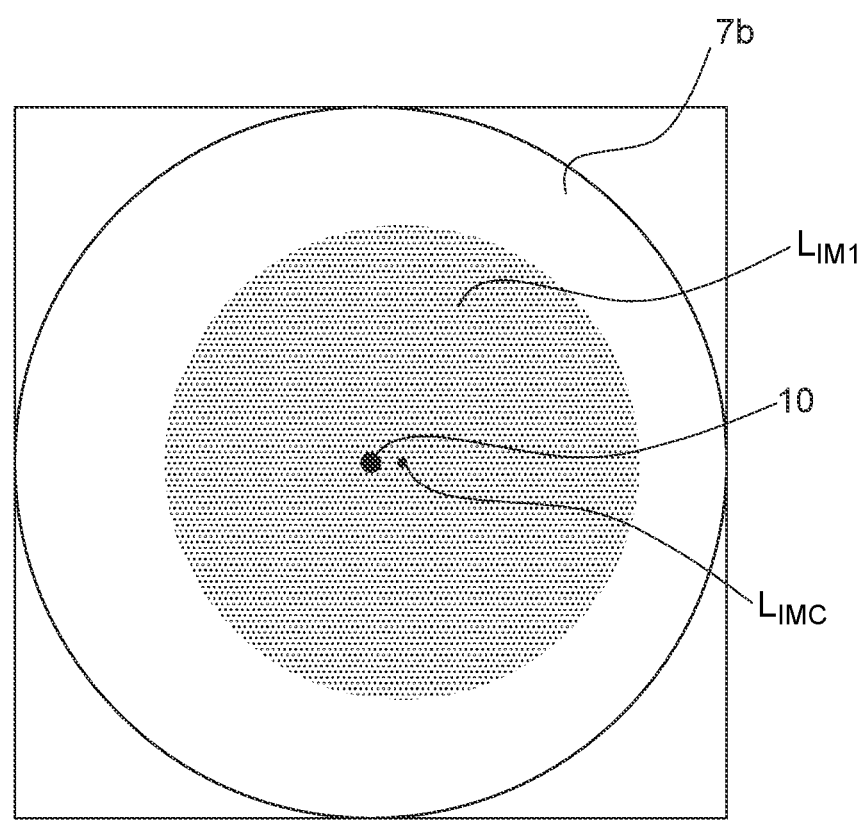
FIG. 4 is a diagram illustrating a state of imaging light in the second state.

FIG. 4 is a diagram illustrating a state of imaging light in the second state. As illustrated in FIG. 4, the area of the imaging light $L_{IM1}$ is smaller than the area of the transmission part 7b. The imaging light $L_{IM1}$ is positioned inside the transmission part 7b.

Furthermore, in the second state, the surface of the sample 8 is inclined at an inclination angle $+\theta_s$. In this case, the central ray $L_{ILC}$ is refracted by the surface of the sample 8. Therefore, the central ray $L_{IMC}$ travels in a direction away from the optical axis 10. As a result, in the second state, the center of the imaging light $L_{IM1}$ is not coincident with the optical axis 10.

As can be understood from the comparison between FIG. 2 and FIG. 4, the center of the imaging light $L_{IM1}$ in the second state is shifted from the center of the imaging light $L_{IM1}$ in the first state in a direction away from the optical axis 10. Furthermore, in the second state, the shifting direction is the right direction in the drawing sheet.

Figure 5:
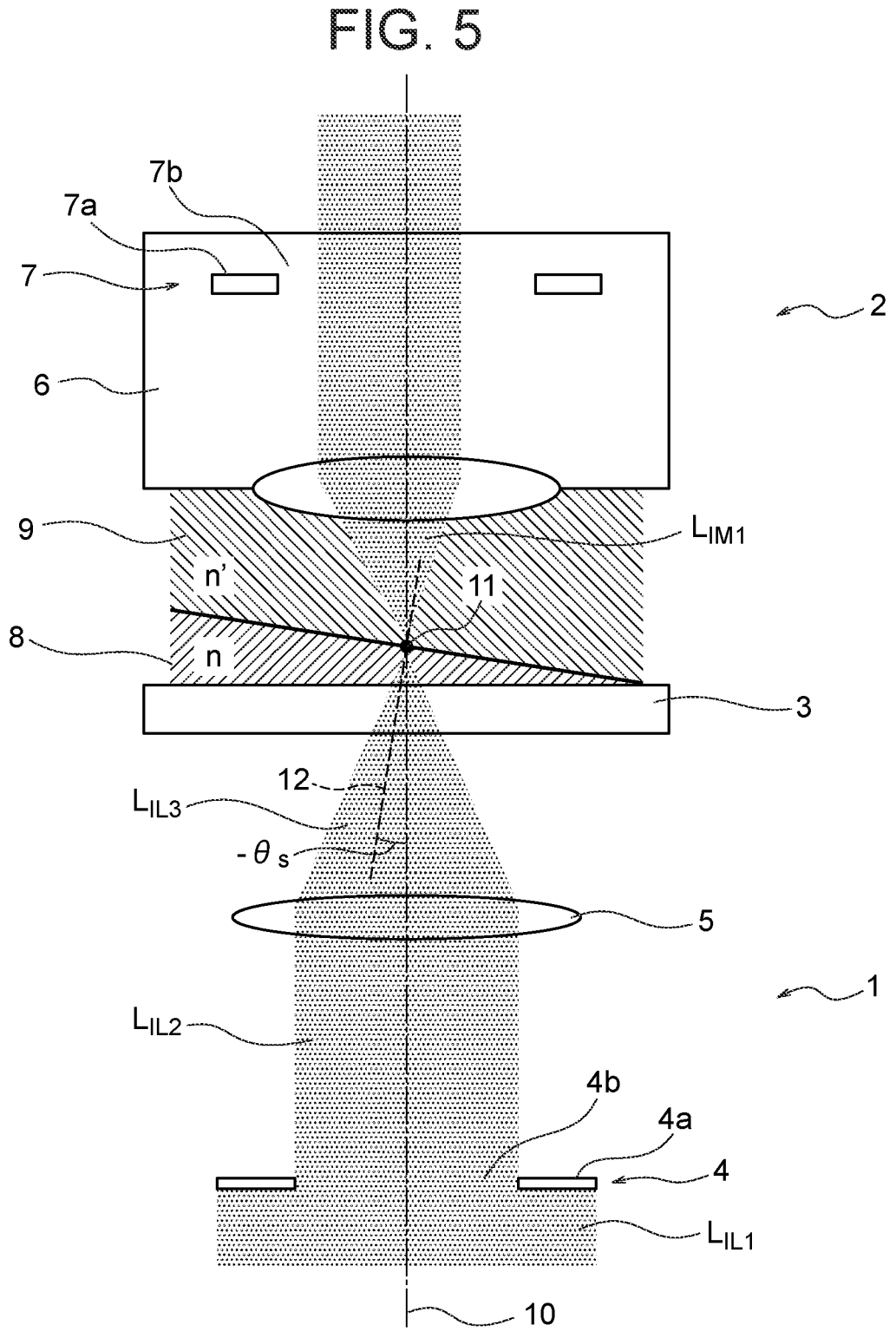
FIG. 5 is a diagram illustrating a state of illumination light and a state of imaging light in a third state.

Next, the relation between illumination light and imaging light in a third state will now described. FIG. 5 is a diagram illustrating a state of illumination light and a state of imaging light in the third state. In the third state, the surface of the sample is flat, but the normal to the plane is nonparallel to the optical axis.

As illustrated in FIG. 5, since the angle between the normal 12 to the plane and the optical axis 10 is $\theta_s$, the surface of the sample 8 is a plane inclined by the inclination angle $\theta_s$. However, unlike the second state, in the third state, $\theta_s$ has a negative value.

In the third state, illumination is performed in the same manner as in the first state. The illumination light $L_{IL3}$ is incident on the observation point 11 on the sample 8. Hence, the observation point 11 is illuminated.

The illumination light $L_{IL3}$ is transmitted through the sample 8. As described above, in the third state, the normal to the plane is nonparallel to the optical axis. In a state in which the normal to the plane is nonparallel to the optical axis, the surface of the sample is inclined. When the surface of the sample is inclined, the central ray $L_{ILC}$ is refracted by the surface of the sample 8.

The imaging light $L_{IM1}$ emanated from the sample 8 reaches the objective lens 6. The imaging light $L_{IM1}$ reaching the objective lens 6 is all incident on the objective lens 6. The imaging light $L_{IM1}$ incident on the objective lens 6 passes through the diaphragm 7 without being shielded by the light-shielding part 7a.

Figure 6:
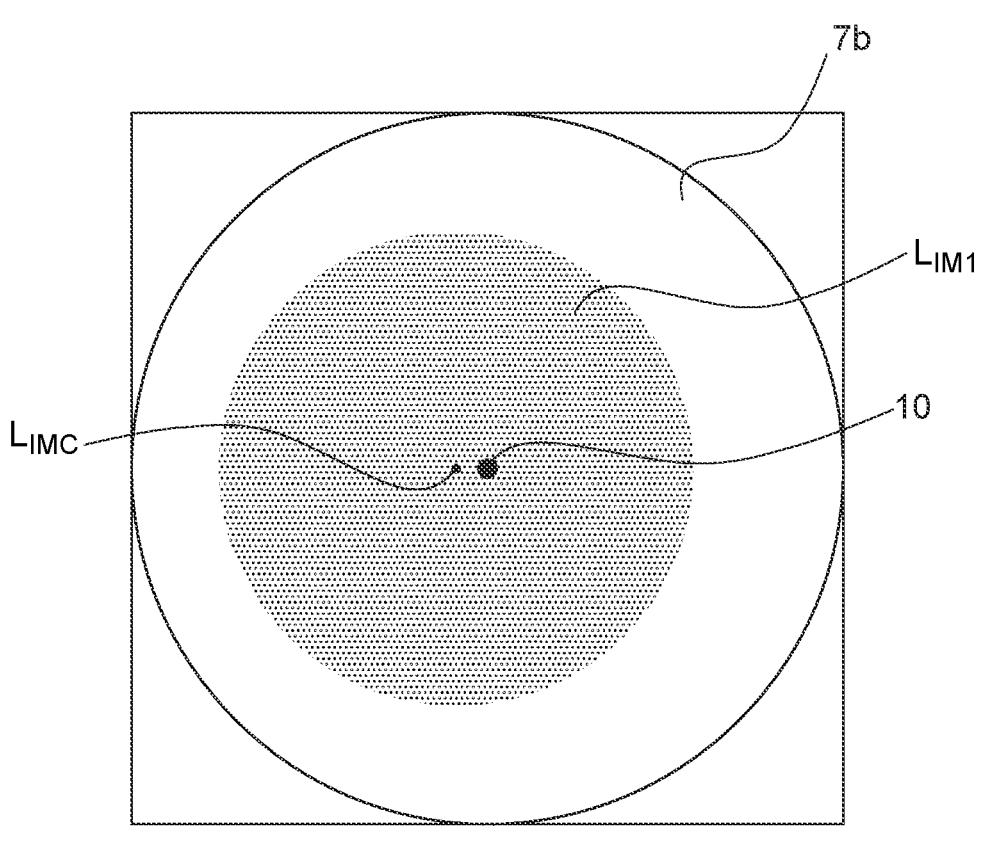
FIG. 6 is a diagram illustrating a state of imaging light in the third state.

FIG. 6 is a diagram illustrating a state of imaging light in the third state. As illustrated in FIG. 6, the area of the imaging light $L_{IM1}$ is smaller than the area of the transmission part 7b. The imaging light $L_{IM1}$ is positioned inside the transmission part 7b.

Furthermore, in the third state, the surface of the sample 8 is inclined at an inclination angle $-\theta_s$. In this case, the central ray $L_{ILC}$ is refracted by the surface of the sample 8. Therefore, the central ray $L_{IMC}$ travels in a direction away from the optical axis 10. As a result, in the third state, the center of the imaging light $L_{IM1}$ is not coincident with the optical axis 10.

As can be understood from the comparison between FIG. 2 and FIG. 6, the center of the imaging light $L_{IM1}$ in the third state is shifted from the center of the imaging light $L_{IM1}$ in the first state in a direction away from the optical axis 10. Furthermore, in the third state, the shifting direction is the left direction in the drawing sheet.

In any of the first state, the second state, and the third state, when being emerged from the observation optical system 2, the imaging light $L_{IM1}$ is a parallel light beam. Then, in the second state and the third state, the imaging light $L_{IM1}$ translates in a direction away from the optical axis 10.

As described above, the image $I_{Light}$ is obtained by capturing the imaging light by the light detection element. Capture of the imaging light includes a capture performed when a sample is placed on the holding member and a capture performed when a sample is not placed on the holding member.

In the capture performed when a sample is placed on the holding member, a predetermined image is obtained. The predetermined image is an image based on a signal output from the light detection element when a sample is placed on the holding member.

In the capture of the imaging light, a range wider than the imaging light is captured. Thus, the predetermined image includes the image $I_{Light}$ and the image $I_{Out}$.

Each of the image $I_{Light}$ and the image $I_{Out}$ is formed with a plurality of pixels. Each pixel has a value corresponding to the brightness of the imaging light. It can be said that the sum (hereinafter referred to as "sum $I_{sum}$") obtained by adding up the values of the pixels in the image $I_{Light}$ represents the brightness of the imaging light. The predetermined image is an image obtained when a sample is placed on the holding member. Thus, it can be said that the sum $I_{sum}$ represents information on one point on the sample.

However, in the first state, the second state, and the third state, only one point on the sample is illuminated. Therefore, information on the entire sample 8 fails to be obtained.

As illustrated in FIG. 1, the illumination light $L_{IL3}$ is collected at the observation point 11. At the observation point 11, a light spot is formed by the illumination optical system 1. The sample 8 is placed on the stage 3. The stage 3 is the holding member.

The sample 8 is positioned at the observation point 11. Then, the scanning unit moves the light spot and the holding member relative to each other. By doing so, it is possible to move the observation point 11 and the sample 8 relative to each other. As a result, information on the entire sample 8 is obtained. The scanning unit will be described later.

Figure 7A:
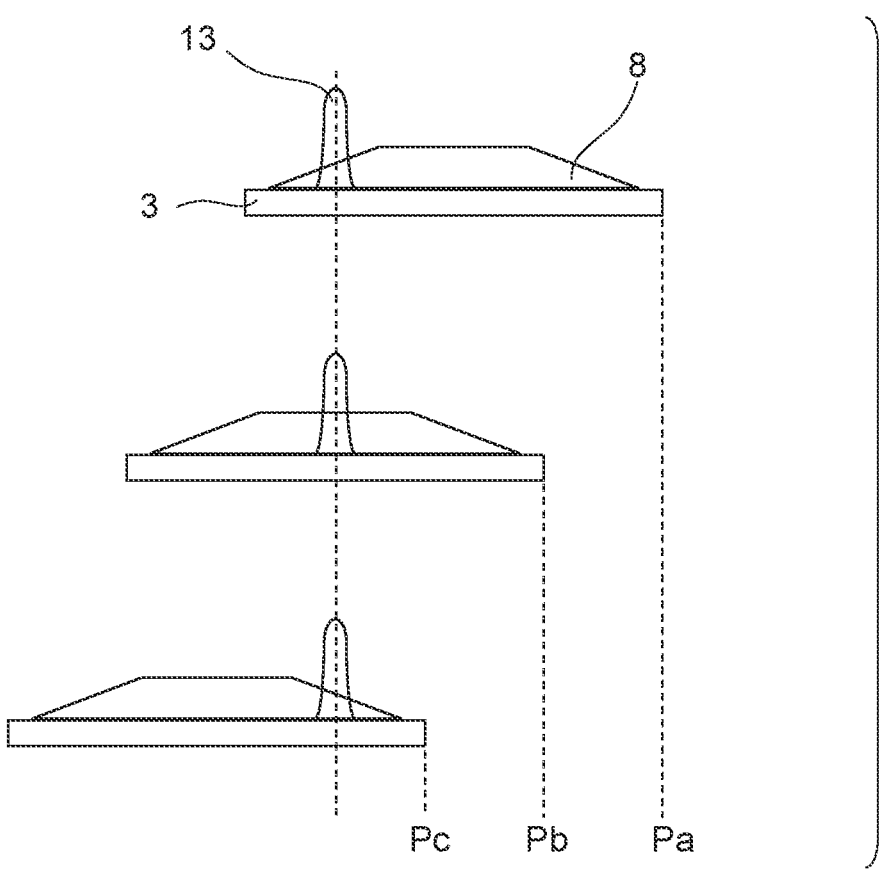
FIG. 7A is a diagram illustrating an example of relative movement.

FIG. 7A is a diagram illustrating an example of relative movement. In this example, the stage 3 is moved in a state in which a light spot 13 is fixed. Hence, information on the entire sample 8 is obtained.

Figure 7B:
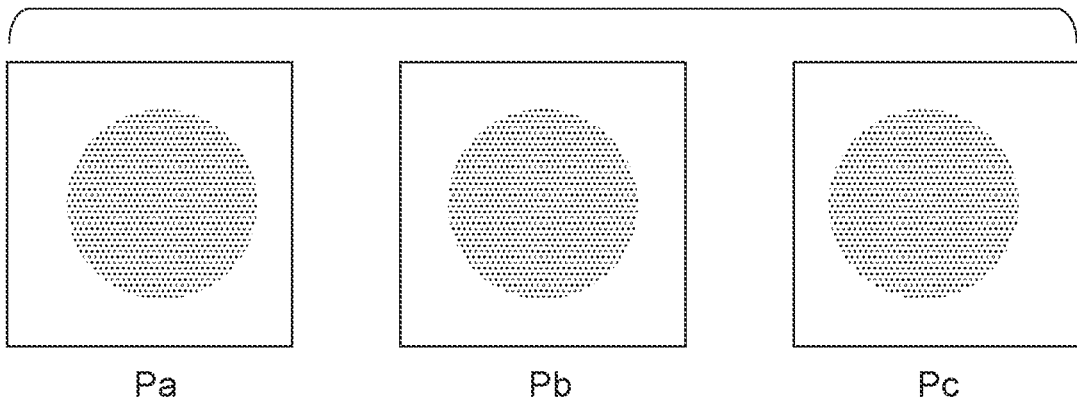
FIG. 7B is a diagram illustrating a state of imaging light.

FIG. 7B is a diagram illustrating a state of imaging light. FIG. 7B illustrates a state of imaging light at a position Pa, a state of imaging light at a position Pb, and a state of imaging light at a position Pc. This imaging light is light emerged from the sample 8 when the sample 8 is illuminated with the light spot 13.

As can be understood from FIG. 7B, the position of imaging light in the image pickup region changes in accordance with the inclination of the surface of the sample 8. Using this change in position, it is possible to generate an image by various observation methods.

Generation of an image is described. In the sample observation apparatus of the present embodiment, an image of a sample is generated based on a predetermined image and a filter. Generation of an image of a sample may be performed, for example, in the image processing device.

The predetermined image and the filter have a plurality of pixels. For example, when the brightness of the predetermined image is represented in 256 gradations, a numerical value from zero to 255 is set in each pixel. The same applies to the filter. When the brightness of the first region and the brightness of the second region are represented in 256 gradations, a numerical value from zero to 255 is set in each pixel of the first region and each pixel of the second region.

The filter has a first region and a second region. The value in the first region is greater than the value in the second region. The value in the first region and the value in the second region are numerical values of the filter.

The number of pixels in the filter is equal to the number of pixels in the predetermined image. Furthermore, the aspect ratio of the filter is equal to the aspect ratio of the predetermined image. Thus, the pixels of the filter and the pixels of the predetermined image have one-to-one correspondence.

Generation of an image of a sample is performed in the image processing device. In the image processing device, an image of a sample is generated based on the predetermined image and the filter. The filter is a filter image for development. That is, the filter is an image used for generating an image of the sample from the predetermined image.

The pixels of the filter and the pixels of the predetermined image have one-to-one correspondence. Then, the product of the value of the predetermined image and the value of the filter is obtained for each of the pixels having one-to-one correspondence. In this way, a new image (hereinafter referred to as "product image") is obtained. The product image also includes an image corresponding to the image $I_{Light}$ (hereinafter referred to as "image $IS_{Light}$") and an image corresponding to the image $I_{Out}$.

As described above, the sum $I_{sum}$ represents information on one point on the sample. Thus, the sum obtained from the value of the image $IS_{Light}$ (hereinafter referred to as "sum $IS_{sum}$") also represents information on one point on the sample. However, the filter is used in generating the image $IS_{Light}$. Therefore, the sum $IS_{sum}$ is affected by the filter.

The sum $IS_{sum}$ represents information on one point on the sample. Then, the sum $IS_{sum}$ is affected by the filter. Thus, the information on one point on the sample is affected by the filter.

The image of the sample is a set of information on one point on the sample. As described above, the information on one point on the sample is affected by the filter. Thus, the image of the sample is affected by the filter. In other words, when a filter used is different, the generated image of the sample is also different.

In the sample observation apparatus of the present embodiment, it is preferable that the first region be a circular region, and the second region be positioned outside the first region.

Figure 8:
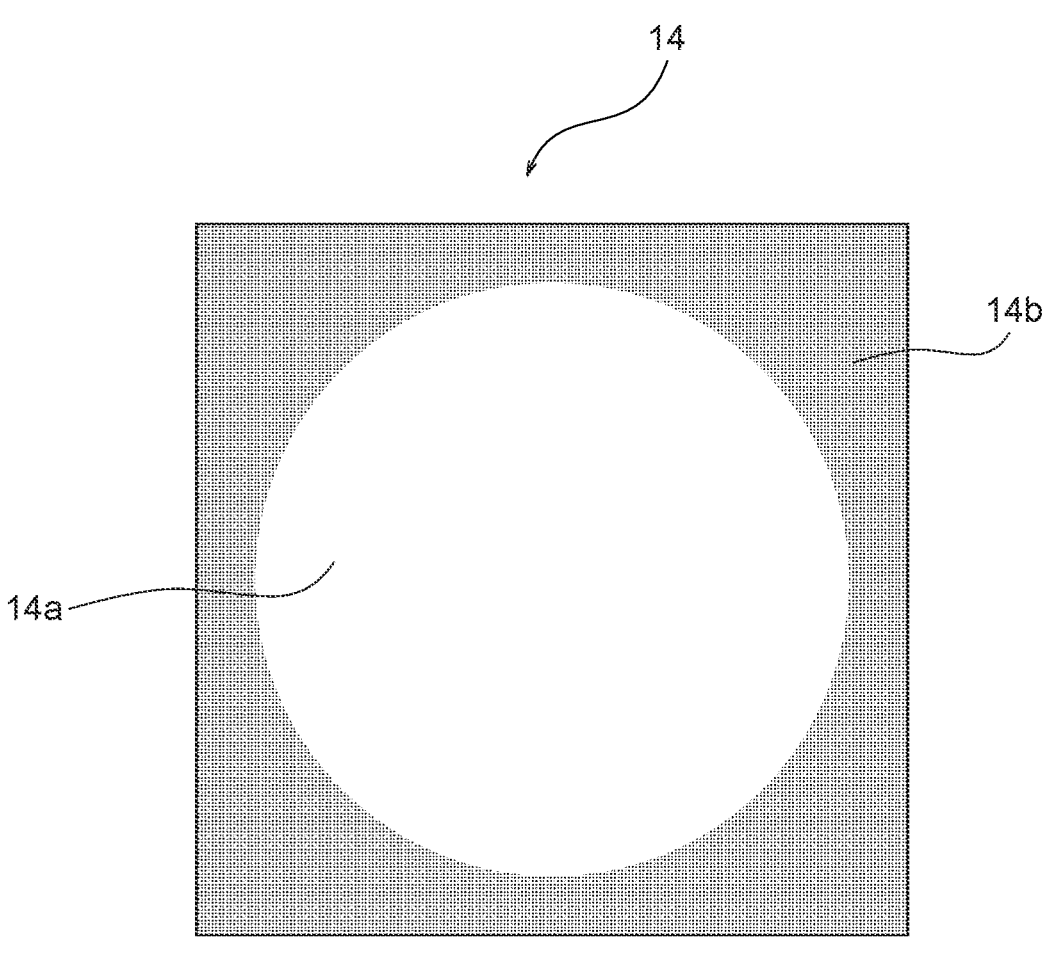
FIG. 8 is a diagram illustrating a first filter.

A first filter is described. FIG. 8 is a diagram illustrating the first filter. A filter 14 is used for generating an image corresponding to a bright-field image in a microscope (hereinafter referred to as "image $IS_{BRI}$").

The filter 14 includes a first region 14a and a second region 14b. The first region 14a is a circular region. The second region 14b is positioned outside the first region 14a. The size of the first region 14a is set based on the size of the image $I_{Light}$.

Each of the first region 14a and the second region 14b has a plurality of pixels. The range of values that can be set for a pixel is predetermined. The same value is set for each pixel in the first region 14a. The same value is also set for each pixel in the second region 14b.

However, the value set in the pixels in the first region 14a is different from the value set in the pixels in the second region 14b. The value set in the pixels in the first region 14a is greater than the value set in the pixels in the second region 14b.

Figure 9A:
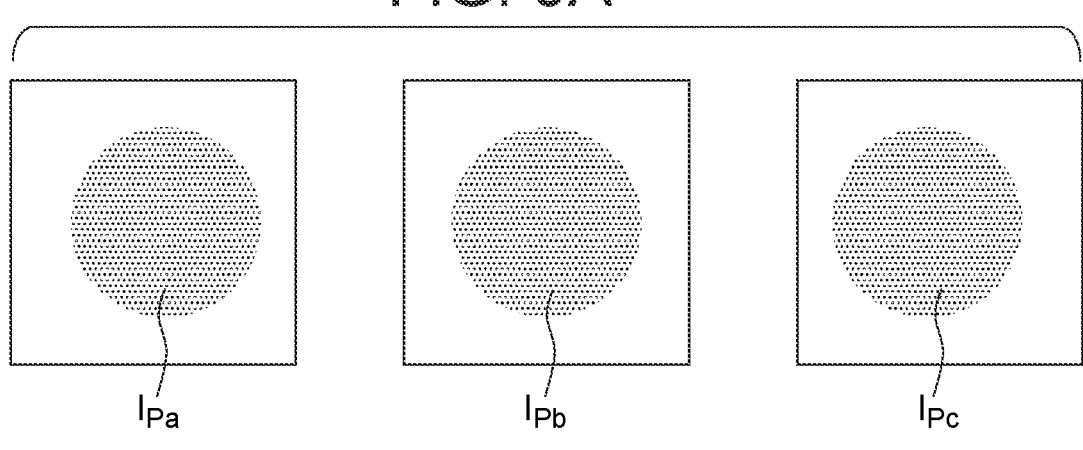
FIG. 9A is a diagram illustrating a predetermined image.
Figure 9B:
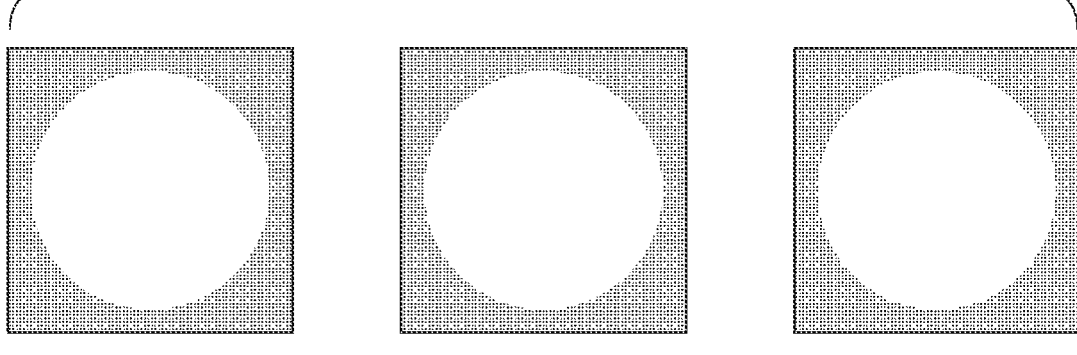
FIG. 9B is a diagram illustrating a filter.
Figure 9C:
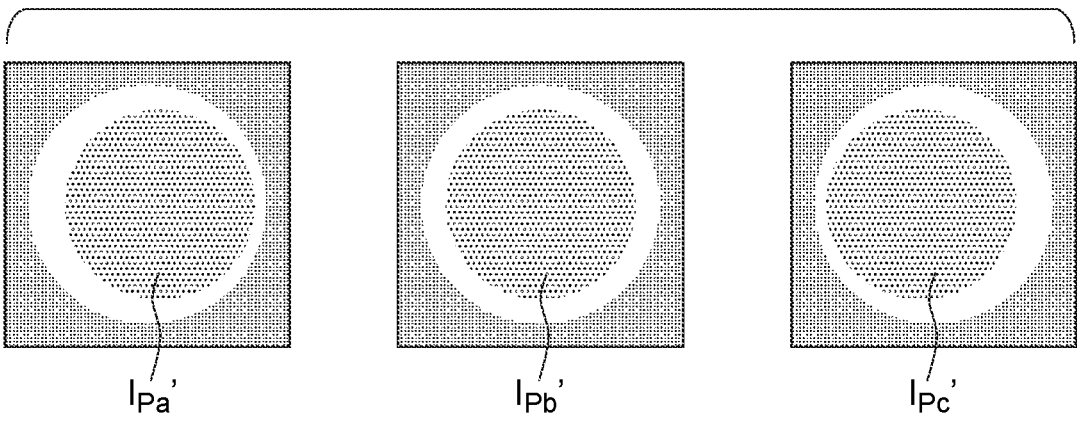
FIG. 9C is an image in which the predetermined image and the filter are superimposed on each other.

FIG. 9A is a diagram illustrating a predetermined image. FIG. 9B is a diagram illustrating a filter. FIG. 9C is an image in which the predetermined image and the filter are superimposed on each other.

FIG. 9A is the same diagram as FIG. 7B. In FIG. 9A, in order from the left side of the drawing sheet, the image of imaging light at the position Pa (hereinafter "image $I_{Pa}$"), the image of imaging light at the position Pb (hereinafter "image $I_{Pb}$"), and the image of imaging light at the position Pc (hereinafter "image $I_{Pc}$") are illustrated.

The image $I_{Pa}$, the image $I_{Pb}$, and the image $I_{Pc}$ are images obtained by capturing the imaging light produced from the light spot 13 illustrated in FIG. 7A. Thus, in the image $I_{Pa}$, the image $I_{Pb}$, and the image $I_{Pc}$, each of the shape and the size is identical in three images.

Furthermore, in FIG. 7A, the sample 8 is a colorless transparent object. Thus, in the image $I_{Pa}$, the image $I_{Pb}$, and the image $I_{Pc}$, the value in each pixel is identical in three images.

As illustrated in FIG. 9B, in acquisition of the product image, the same filter, that is, the filter 14 is used for each of three predetermined images.

In FIG. 9C, an image $I_{Pa}'$, an image $I_{Pb}'$, and an image $I_{Pc}'$ are illustrated. The image $I_{Pa}'$ is an image positioned within the first region 14a in the image $I_{Pa}$. The image $I_{Pb}'$ is an image positioned within the first region 14a in the image $I_{Pb}$. The image $I_{Pc}'$ is an image positioned within the first region 14a in the image $I_{Pc}$.

In the filter 14, the first region 14a is set to a size including the entire image $I_{Pa}$, the entire image $I_{Pb}$, and the entire image $I_{Pc}$. Therefore, as illustrated in FIG. 9C, the shape and the size of the image $I_{Pa}'$ are identical to those of the image $I_{Pa}$. The shape and the size of the image $I_{Pb}'$ are identical to those of the image $I_{Pb}$. The shape and the size of the image $I_{Pc}'$ are identical to those of the image $I_{Pc}$.

As just described, when the filter 14 is used, the area of the image $I_{Pa}'$, the area of the image $I_{Pb}'$, and the area of the image $I_{Pc}'$ are identical in three images.

Three product images are obtained from three predetermined images and the filter 14. Three product images include an image $IS_{Pa}$, an image $IS_{Pb}$, and an image $IS_{Pc}$. The image $IS_{Pa}$ is an image corresponding to the image $I_{Pa}'$. The image $IS_{Pb}$ is an image corresponding to the image $I_{Pb}'$. The image $IS_{Pc}$ is an image corresponding to the image $I_{Pc}'$.

In the image $I_{Pa}'$, the image $I_{Pb}'$, and the image $I_{Pc}'$, the value in each pixel is identical in three images. Then, the filter used for acquisition of the product image is also identical. Thus, in the image $IS_{Pa}$, the image $IS_{Pb}$, and the image $IS_{Pc}$, the value in each pixel is identical in three images.

Furthermore, when the filter 14 is used, the area of the image $I_{Pa}'$, the area of the image $I_{Pb}'$, and the area of the image $I_{Pc}'$ are identical in three images as described above. Thus, in the image $IS_{Pa}$, the image $IS_{Pb}$, and the image $IS_{Pc}$, the area is identical in three images.

As described above, the sum $IS_{sum}$ represents information on one point on the sample. In the image $IS_{Pa}$, the image $IS_{Pb}$, and the image $IS_{Pc}$, the area and the value in each pixel are identical in three images. Therefore, in the image $IS_{Pa}$, the image $IS_{Pb}$, and the image $IS_{Pc}$, the sum obtained from the image is identical in three images.

In the image $IS_{Pa}$, the image $IS_{Pb}$, and the image $IS_{Pc}$, the phase amount at the irradiation position of the light spot differs between the image $IS_{Pa}$ and the image $IS_{Pb}$ and differs between the image $IS_{Pb}$ and the image $IS_{Pc}$. In the image $IS_{Pa}$ and the image $IS_{Pc}$, the phase amount is the same but the direction in which the phase changes is different.

That the sum is identical in three images means that when the filter 14 is used, it is not possible to detect change in phase amount and the direction in which the phase changes, as change in brightness, if the sample is a colorless transparent object.

Even in bright-field observation with a microscope, when the sample is a colorless transparent object, it is not possible to detect change in phase amount and the direction in which the phase changes, as change in brightness. Thus, by using the filter 14, it is possible to generate an image similar to a bright-field image in a microscope.

In the sample observation apparatus of the present embodiment, it is preferable that the first region be a semi-circular region, and the second region be positioned outside the first region.

Figure 10:
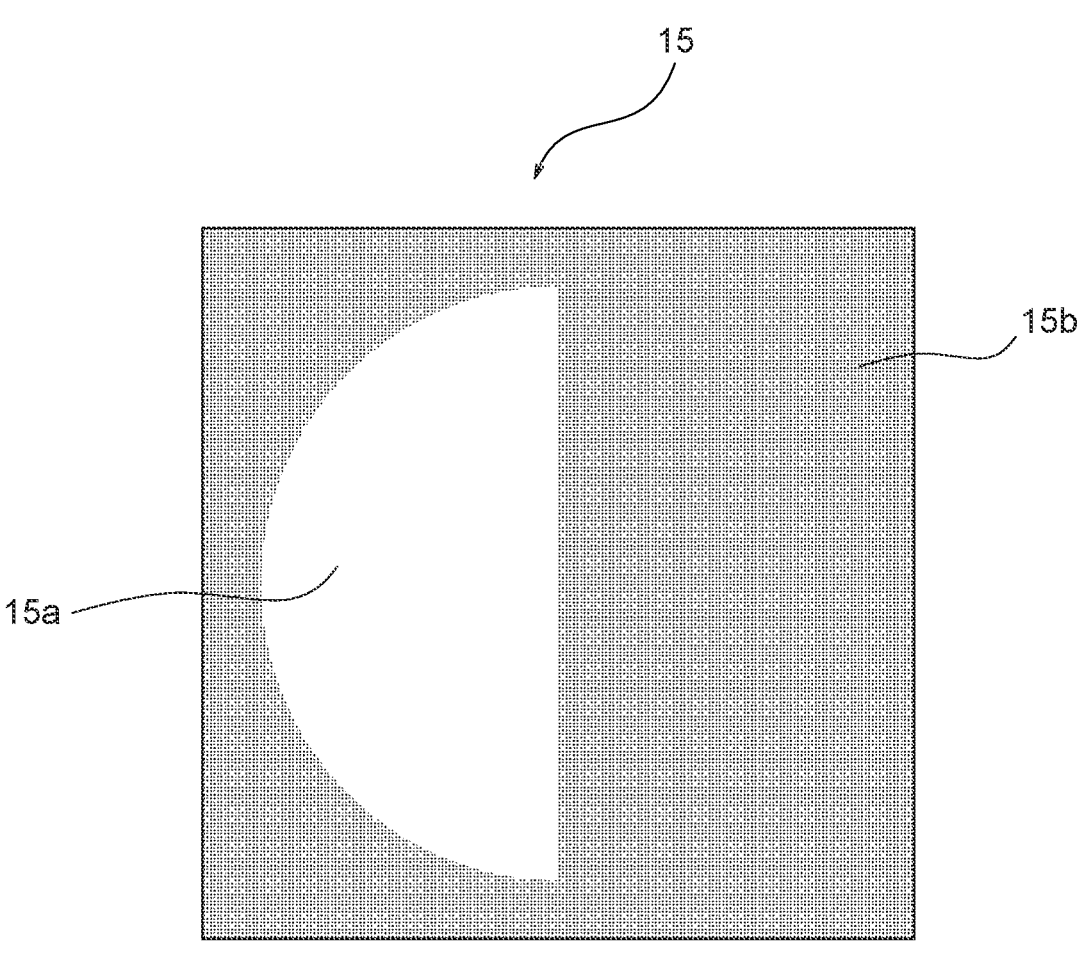
FIG. 10 is a diagram illustrating a second filter.

A second filter is described. FIG. 10 is a diagram illustrating the second filter. A filter 15 is used for generating an image corresponding to an oblique illumination image in a microscope (hereinafter referred to as "image $IS_{OBL}$").

The filter 15 includes a first region 15a and a second region 15b. The first region 15a is a semi-circular region. The second region 15b is positioned outside the first region 15a. The size of the first region 15a is set based on the size of the image $I_{Light}$.

Each of the first region 15a and the second region 15b has a plurality of pixels. The range of values that can be set for a pixel is predetermined. The same value is set for each pixel in the first region 15a. The same value is also set for each pixel in the second region 15b.

However, the value set in the pixels in the first region 15a is different from the value set in the pixels in the second region 15b. The value set in the pixels in the first region 15a is greater than the value set in the pixels in the second region 15b.

Figure 11A:
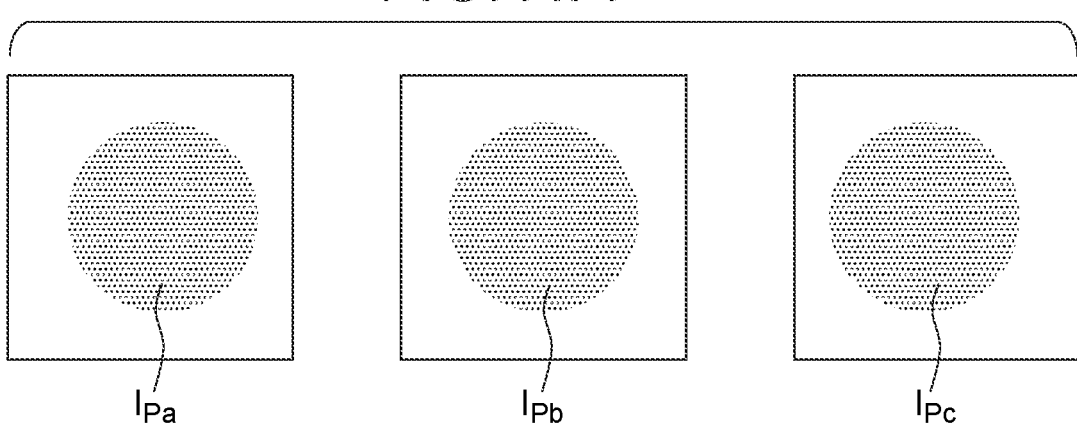
FIG. 11A is a diagram illustrating a predetermined image.
Figure 11B:
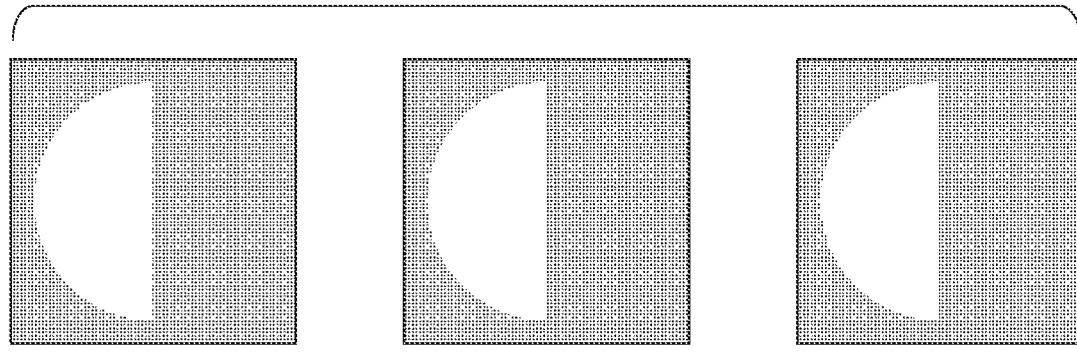
FIG. 11B is a diagram illustrating a filter.
Figure 11C:
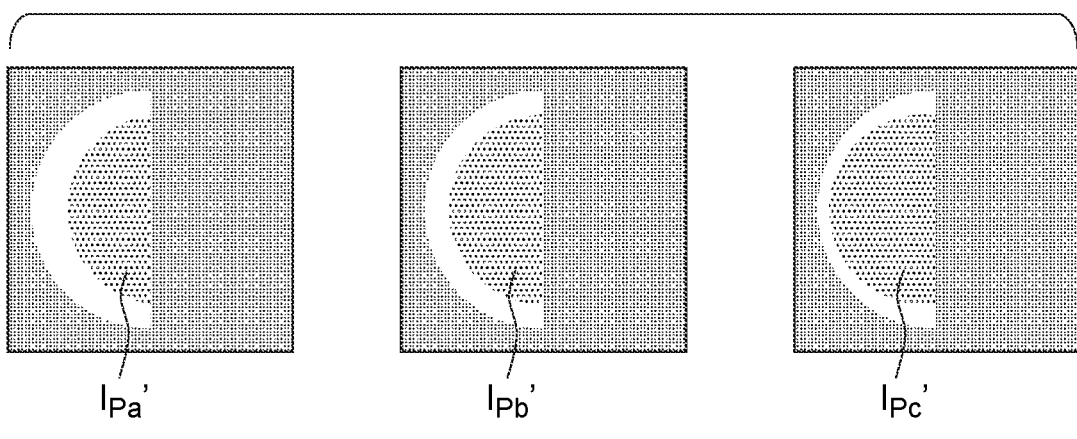
FIG. 11C is an image in which the predetermined image and the filter are superimposed on each other.

FIG. 11A is a diagram illustrating a predetermined image. FIG. 11B is a diagram illustrating a filter. FIG. 11C is an image in which the predetermined image and the filter are superimposed on each other.

FIG. 11A is the same diagram as FIG. 7B. In FIG. 11A, the image $I_{Pa}$, the image $I_{Pb}$, and the image $I_{Pc}$ are illustrated. A description of the image $I_{Pa}$, the image $I_{Pb}$, and the image $I_{Pc}$ is omitted.

As illustrated in FIG. 11B, in acquisition of the product image, the same filter, that is, the filter 15 is used for each of three predetermined images.

In FIG. 11C, an image $I_{Pa}'$, an image $I_{Pb}'$, and an image $I_{Pc}'$ are illustrated. The image $I_{Pa}'$ is an image positioned within the first region 15a in the image $I_{Pa}$. The image $I_{Pb}'$ is an image positioned within the first region 15a in the image $I_{Pb}$. The image $I_{Pc}'$ is an image positioned within the first region 15a in the image $I_{Pc}$.

In the filter 15, the first region 15a is set to a size including a part of the image $I_{Pa}$, a part of the image $I_{Pb}$, and a part of the image $I_{Pc}$. Therefore, as illustrated in FIG. 11C, the shape and the size of the image $I_{Pa}'$ are different from those of the image $I_{Pa}$. The shape and the size of the image $I_{Pb}'$ are different from those of the image $I_{Pb}$. The shape and the size of the image $I_{Pc}'$ are different from those of the image $I_{Pc}$.

Furthermore, the position relative to the first region 15a differs among the image $I_{Pa}$, the image $I_{Pb}$, and the image $I_{Pc}$. Therefore, when the filter 15 is used, the area of the image $I_{Pa}'$, the area of the image $I_{Pb}'$, and the area of the image $I_{Pc}'$ are different in three images.

Three product images are obtained from three predetermined images and the filter 15. Three product images include an image $IS_{Pa}$, an image $IS_{Pb}$, and an image $IS_{Pc}$.

In the image $I_{Pa}'$, the image $I_{Pb}'$, and the image $I_{Pc}'$, the value in each pixel is identical in three images. Then, the filter used for acquisition of the product image is also identical. Thus, in the image $IS_{Pa}$, the image $IS_{Pb}$, and the image $IS_{Pc}$, the value in each pixel is identical in three images.

However, when the filter 15 is used, the area of the image $I_{Pa}'$, the area of the image $I_{Pb}'$, and the area of the image $I_{Pc}'$ are different in three images as described above. Thus, in the image $IS_{Pa}$, the image $IS_{Pb}$, and the image $IS_{Pc}$, the area also differs among three images.

As described above, the sum $IS_{sum}$ represents information on one point on the sample. In the image $IS_{Pa}$, the image $IS_{Pb}$, and the image $IS_{Pc}$, the value in each pixel is identical in three images, but the area differs among three images. Therefore, in the image $IS_{Pa}$, the image $IS_{Pb}$, and the image $IS_{Pc}$, the sum obtained from the image differs among three images.

In the image $IS_{Pa}$, the image $IS_{Pb}$, and the image $IS_{Pc}$, the phase amount at the irradiation position of the light spot differs between the image $IS_{Pa}$ and the image $IS_{Pb}$ and differs between the image $IS_{Pa}$ and the image $IS_{Pc}$. In the image $IS_{Pa}$ and the image $IS_{Pc}$, the phase amount is the same, but the direction in which the phase changes is different.

That the sum differs among three images means that when the filter 15 is used, it is possible to detect change in phase amount and the direction in which the phase changes, as change in brightness, if the sample is a colorless transparent object.

Even in oblique illumination observation with a microscope, when the sample is a colorless transparent object, it is possible to detect change in phase amount and the direction in which the phase changes, as change in brightness. Thus, by using the filter 15, it is possible to generate an image similar to an oblique illumination image in a microscope.

The predetermined image illustrated in FIG. 11A and the predetermined image illustrated in FIG. 9A are images obtained by the light spot 13 illustrated in FIG. 7A. This means that in the sample observation apparatus of the present embodiment, an illumination state is the same in generation of the image $IS_{OBL}$ and generation of the image $IS_{BRI}$. As just described, in the sample observation apparatus of the present embodiment, it is possible to generate the image $IS_{OBL}$ with the same illumination as the illumination used at a time of generating the image $IS_{BRI}$.

Figure 12:
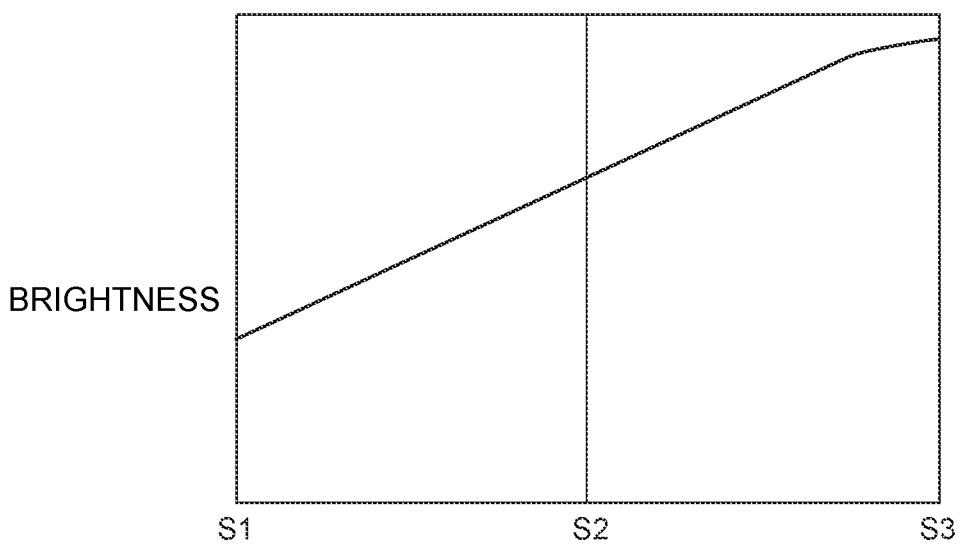
FIG. 12 is a graph illustrating the relation between the shift amount of an image of imaging light and brightness.

FIG. 12 is a graph illustrating the relation between the shift amount of an image of imaging light and brightness. This graph is a graph obtained when the filter 15 is used.

As illustrated in FIG. 1, the light-shielding member 4 is disposed at the condenser lens 5. The image $I_{Light}$ is an image of light passing through the transmission region 4b. Thus, the horizontal axis can be considered as the shift amount of an aperture disposed at the condenser lens 5. On the other hand, the brightness on the vertical axis can be obtained from the overlap between the image $I_{Light}$ and the first region of the filter.

When the filter 15 is used, as illustrated in FIG. 11C, the area of the image $I_{Pa}'$ is smaller than the area of the image $I_{Pb}'$, and the area of the image $I_{Pb}'$ is smaller than the area of the image $I_{Pc}'$.

Thus, in the image of the sample 8 illustrated in FIG. 7A, the brightness at the position Pa is darker than the brightness at the position Pb, and the brightness at the position Pb is darker than the brightness at the position Pc. That is, the brightness is higher in the order of the position Pa, the position Pb, and the position Pc.

In the graph illustrated in FIG. 12, for example, the brightness at a time of a shift amount S1 corresponds to the brightness at the position Pa. The brightness at a time of a shift amount S2 corresponds to the brightness at the position Pb. The brightness at a time of a shift amount S3 corresponds to the brightness at the position Pc.

Figure 13:
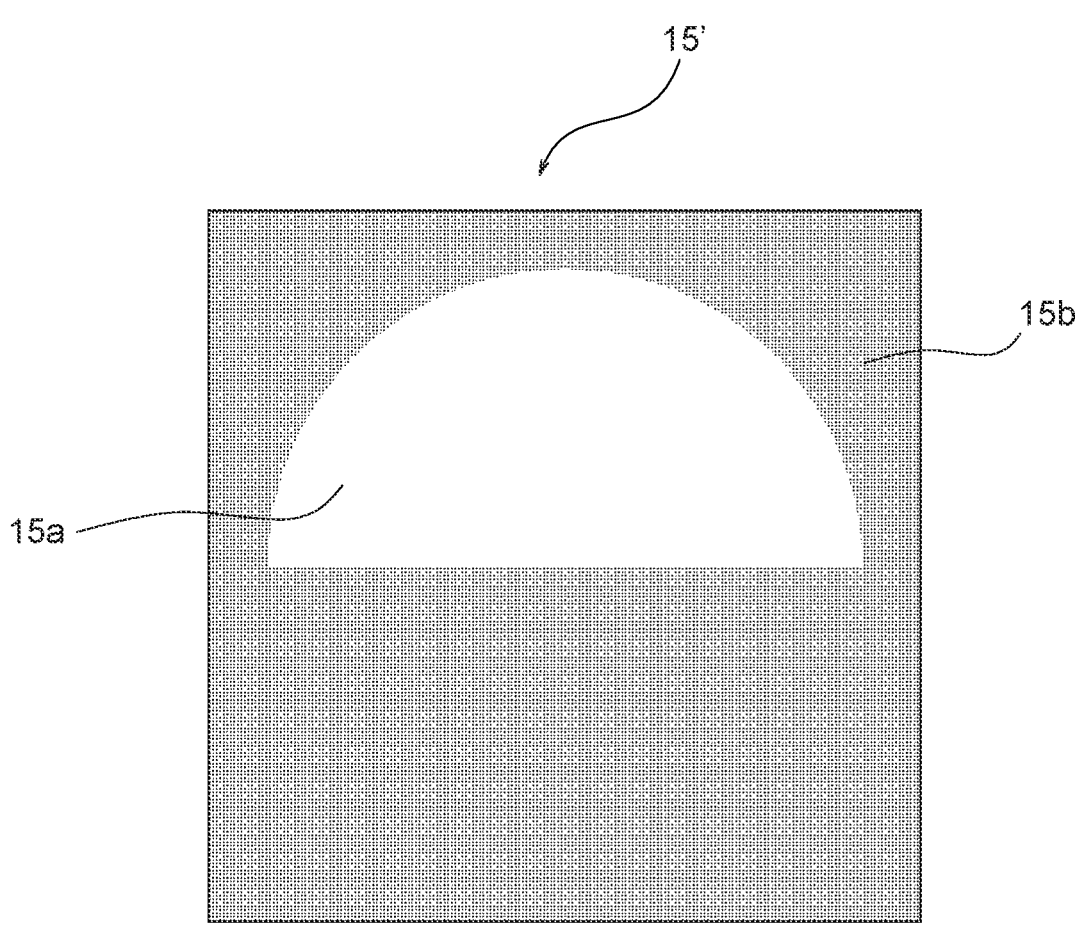
FIG. 13 is a diagram illustrating a first modification of the second filter.

FIG. 13 is a diagram illustrating a first modification of the second filter. A filter 15' is also used for generating an image $IS_o$. The filter 15' is an image obtained by rotating the filter 15 by 90 degrees.

In the filter 15', it is possible to detect change in phase in a direction orthogonal to the filter 15, as change in brightness.

Figure 14:
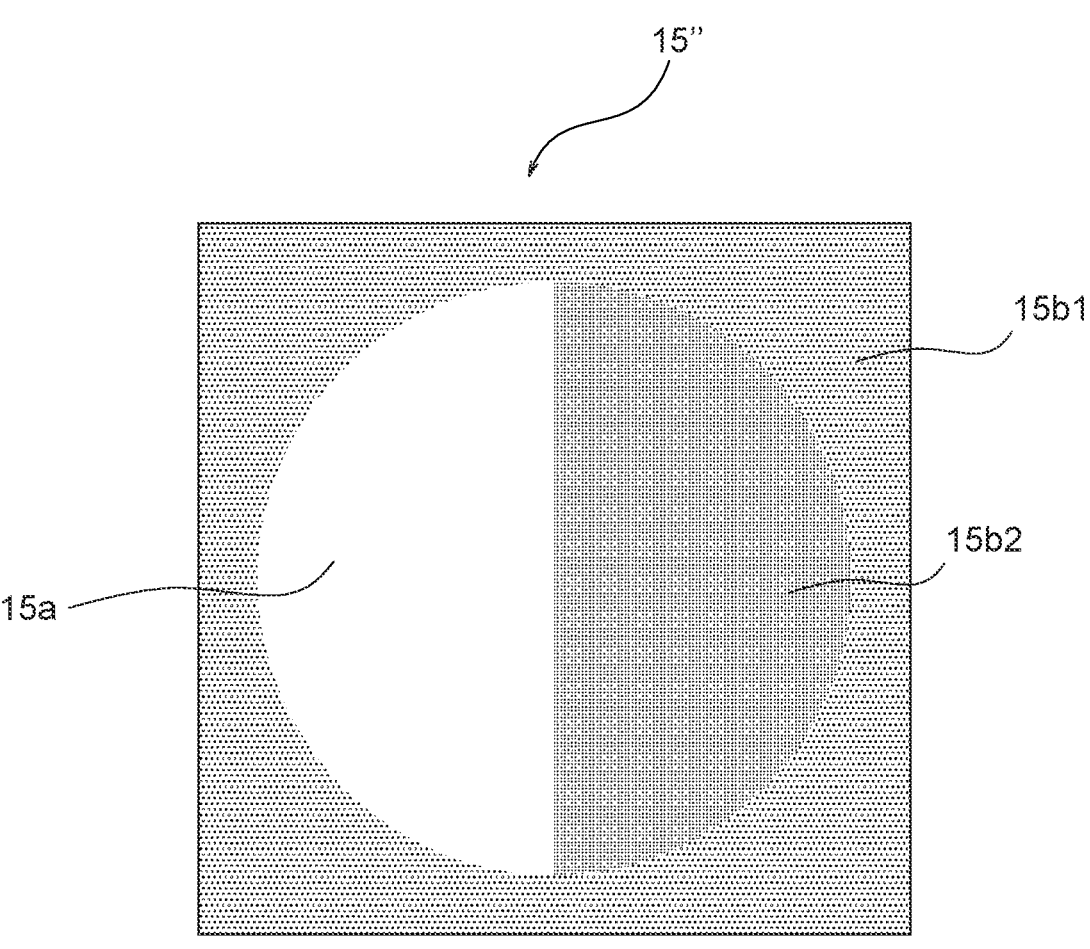
FIG. 14 is a diagram illustrating a second modification of the second filter.

FIG. 14 is a diagram illustrating a second modification of the second filter. A filter 15'' is also used for generating the image $IS_o$.

In the filter 15'', the second region includes a region 15b1 and a region 15b2. In the filter 15'', the value set for the first region 15a is the largest, and the value set for the region 15b2 is the smallest.

For example, it is assumed that in the filter 15, zero is set as the smallest value for the second region 15b. In this case, when the image $I_{Light}$ is positioned in the second region 15b, the value of the image $IS_{Light}$ is zero.

In comparison, in the filter 15'', zero is set as the smallest value for the region 15b2. In this case, a value greater than zero is set for the region 15b1. Therefore, even when the image $I_{Light}$ is positioned in the region 15b1, the value of the image $IS_{Light}$ is not zero. As a result, the range in which change in phase can be detected as change in brightness becomes wider.

Figure 15:
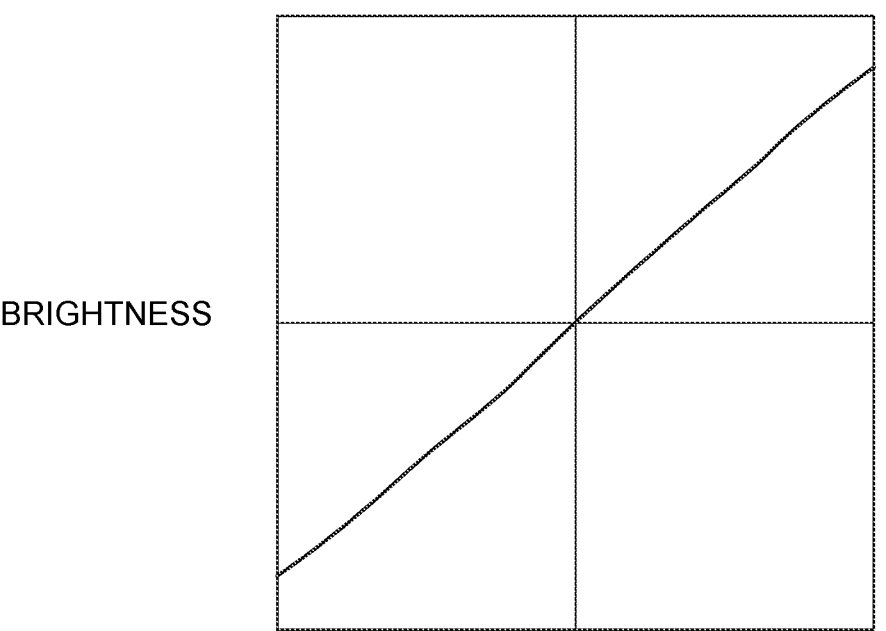
FIG. 15 is a graph illustrating the relation between the shift amount of an image of imaging light and brightness.

FIG. 15 is a graph illustrating the relation between the shift amount of an image of imaging light and brightness. This graph is a graph obtained when the filter 15'' is used. Compared with the graph illustrated in FIG. 12, the change in brightness is larger. Therefore, it is possible to generate an image with a high SN ratio.

In the sample observation apparatus of the present embodiment, it is preferable that the filter include a third region, the first region be an annular region, the second region be positioned outside the first region, and the third region be positioned inside the first region.

Figure 16:
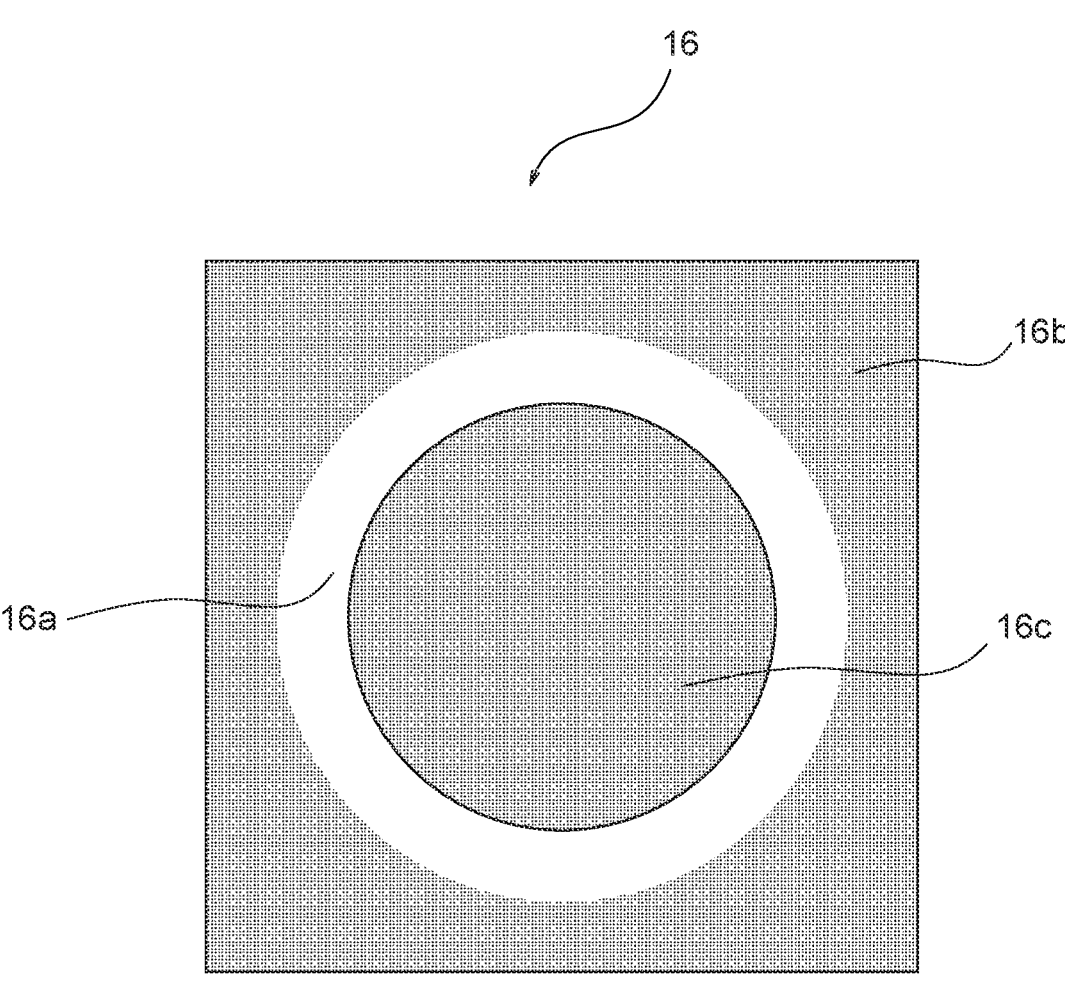
FIG. 16 is a diagram illustrating a third filter.

A third filter is described. FIG. 16 is a diagram illustrating the third filter. A filter 16 is used for generating an image corresponding to an IVC image in a microscope (hereinafter referred to as "image $IS_{IVC}$").

The filter 16 includes a first region 16a and a second region 16b. The filter 16 further includes a third region 16c.

The first region 16a is an annular region. The second region 16b is positioned outside the first region 16a. The third region 16c is positioned inside the first region 16a. The third region 16c is a circular region. The position and the size of the first region 16a are set based on the size of the image $I_{Light}$.

When the position and the size of the first region 16a are set as appropriate, in the first state, the outer edge of the image $I_{Light}$ is included in the first region 16a. That is, the outer edge of the image $I_{Light}$ is positioned outside the third region 16c and inside the second region 16b.

Each of the first region 16a and the second region 16b has a plurality of pixels. The range of values that can be set for a pixel is predetermined. The same value is set for each pixel in the first region 16a. The same value is also set for each pixel in the second region 16b.

However, the value set in the pixels in the first region 16a is different from the value set in the pixels in the second region 16b. The value set in the pixels in the first region 16a is greater than the value set in the pixels in the second region 16b.

The third region 16c also has a plurality of pixels. The range of values that can be set for a pixel is predetermined. The same value is set for each pixel in the third region 16c.

The value set in the pixels in the first region 16a is different from the value set in the pixels in the third region 16c. The value set in the pixels in the first region 16a is greater than the value set in the pixels in the third region 16c.

The value set in the pixels in the second region 16b may be the same as or may be different from the value set in the pixels in the third region 16c. Furthermore, the value set in the pixels in the second region 16b may be greater or may be smaller than the value set in the pixels in the third region 16c.

Figure 17A:
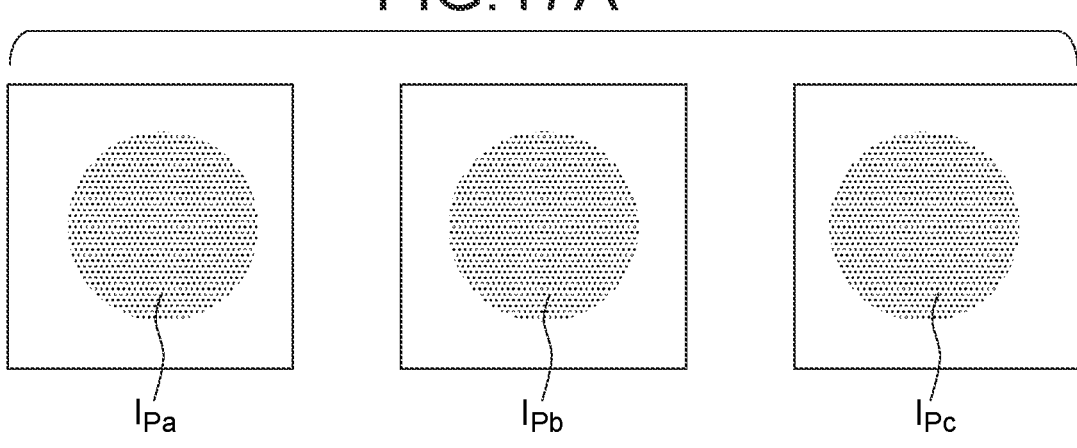
FIG. 17A is a diagram illustrating a predetermined image.
Figure 17B:
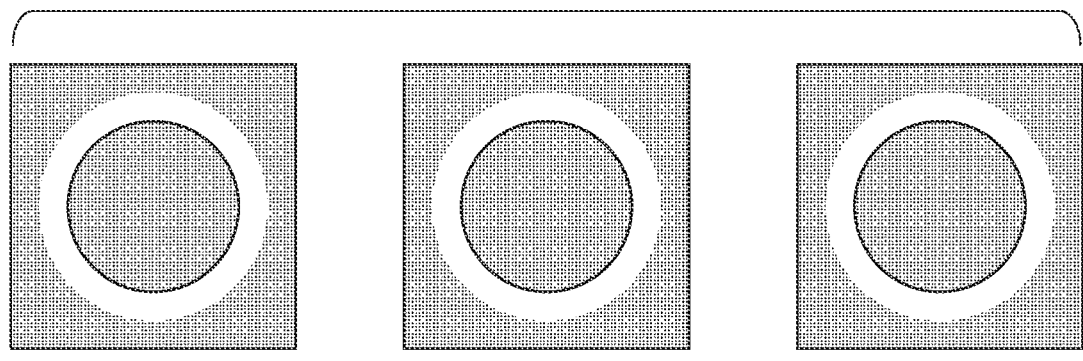
FIG. 17B is a diagram illustrating a filter.
Figure 17C:
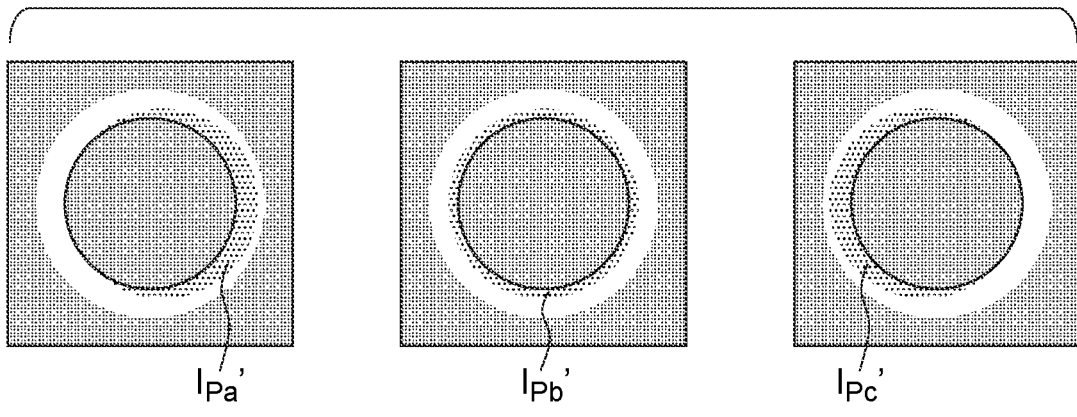
FIG. 17C is an image in which the predetermined image and the filter are superimposed on each other.

FIG. 17A is a diagram illustrating a predetermined image. FIG. 17B is a diagram illustrating a filter. FIG. 17C is an image in which the predetermined image and the filter are superimposed on each other.

FIG. 17A is the same diagram as FIG. 7B. Thus, in FIG. 17A, the image $I_{Pa}$, the image $I_{Pb}$, and the image $I_{Pc}$ are illustrated. A description of the image $I_{Pa}$, the image $I_{Pb}$, and the image $I_{Pc}$ is omitted.

As illustrated in FIG. 17B, in acquisition of the product image, the same filter, that is, the filter 16 is used for each of three predetermined images.

In FIG. 17C, an image $I_{Pa}{'}$, an image $I_{Pb}{'}$, and an image $I_{Pc}{'}$ are illustrated. The image $I_{Pa}{'}$ is an image positioned within the first region 16a in the image $I_{Pa}$. The image $I_{Pb}{'}$ is an image positioned within the first region 16a in the image $I_{Pb}$. The image $I_{Pc}{'}$ is an image positioned within the first region 16a in the image $I_{Pc}$.

In the filter 16, the first region 16a is set to a size including a part of the image $I_{Pa}$, a part of the image $I_{Pb}$, and a part of the image $I_{Pc}$. Therefore, as illustrated in FIG. 17C, the shape and the size of the image $I_{Pa}{'}$ are different from those of the image $I_{Pa}$. The shape and the size of the image $I_{Pb}{'}$ are different from those of the image $I_{Pb}$. The shape and the size of the image $I_{Pc}{'}$ are different from those of the image $I_{Pc}$.

Furthermore, the position relative to the first region 16a differs among the image $I_{Pa}$, the image $I_{Pb}$, and the image $I_{Pc}$. However, the position of the image $I_{Pa}$ and the position of the image $I_{Pc}$ are symmetric to the position of the image $I_{Pb}$. Therefore, when the filter 16 is used, the area of the image $I_{Pb}{'}$ is different from the area of the image $I_{Pa}{'}$ and the area of the image $I_{Pc}{'}$, but the area of the image $I_{Pa}{'}$ and the area of the image $I_{Pc}{'}$ are the same.

Three product images are obtained from three predetermined images and the filter 16. Three product images include an image $IS_{Pa}$, an image $IS_{Pb}$, and an image $IS_{Pc}$.

In the image $I_{Pa}{'}$, the image $I_{Pb}{'}$, and the image $I_{Pc}{'}$, the value in each pixel is identical in three images. Then, the filter used for acquisition of the product image is also identical. Thus, in the image $IS_{Pa}$, the image $IS_{Pb}$, and the image $IS_{Pc}$, the value in each pixel is identical in three images.

However, when the filter 16 is used, the area of the image $I_{Pb}{'}$ is different from the area of the image $I_{Pa}{'}$ and the area of the image $I_{Pc}{'}$, but the area of the image $I_{Pa}{'}$ and the area of the image $I_{Pc}{'}$ are the same, as described above. Thus, even in the image $IS_{Pa}$, the image $IS_{Pb}$, and the image $IS_{Pc}$, the area of the image $IS_{Pb}$ is different from the area of the image $IS_{Pa}$ and the area of the image $IS_{Pc}$, but the area of the image $IS_{Pa}$ and the area of the image $IS_{Pc}$ are the same.

As described above, the sum obtained from the value of the image $IS_{Light}$ represents information on one point on the sample. In the image $IS_{Pa}$, the image $IS_{Pb}$, and the image $IS_{Pc}$, the value in each pixel is identical in three images. However, the area differs between the image $IS_{Pb}$ and the image $IS_{Pa}$, the area differs between the image $IS_{Pb}$ and the image $IS_{Pc}$, and the area is the same in the image $IS_{Pa}$ and the image $IS_{Pc}$.

Therefore, in the image $IS_{Pa}$, the image $IS_{Pb}$, and the image $IS_{Pc}$, the sum obtained from the image differs between the image $IS_{Pb}$ and the image $IS_{Pa}$, differs between the image $IS_{Pb}$ and the image $IS_{Pc}$, and is the same in the image $IS_{Pa}$ and the image $IS_{Pc}$.

In the image $IS_{Pa}$, the image $IS_{Pb}$, and the image $IS_{Pc}$, the phase amount at the irradiation position of the light spot differs between the image $IS_{P}a$ and the image $IS_{Pb}$ and between the image $IS_{Pa}$ and the image $IS_{Pc}$. In the image $IS_{Pa}$ and the image $IS_{Pc}$, the phase amount is the same, but the direction in which the phase changes is different.

That the sum differs between the image $IS_{Pb}$ and the image $IS_{Pa}$, differs between the image $IS_{Pb}$ and the image $IS_{Pc}$, and is the same in the image $IS_{Pa}$ and the image $IS_{Pc}$ means that when the filter 16 is used, it is possible to detect change in phase as change in brightness, but it is not possible to detect the direction in which the phase changes as change in brightness, if the sample is a colorless transparent object.

Even in IVC observation with a microscope, when the sample is a colorless transparent object, it is possible to detect change in phase as change in brightness. Furthermore, in IVC observation, the direction in which the phase changes is not detected as change in brightness. Therefore, in IVC observation, an image with no directivity is obtained. Thus, by using the filter 16, it is possible to generate an image similar to an IVC image in a microscope.

The predetermined image illustrated in FIG. 17A and the predetermined image illustrated in FIG. 9A are images obtained by the light spot 13 illustrated in FIG. 7A. This means that in the sample observation apparatus of the present embodiment, the illumination state is the same in generation of the image $IS_{IVC}$ and generation of the image $IS_{BRI}$. In this way, in the sample observation apparatus of the present embodiment, it is possible to generate the image $IS_{IVC}$ with the same illumination as the illumination used at a time of generating the image $IS_{BRI}$.

Figure 18:
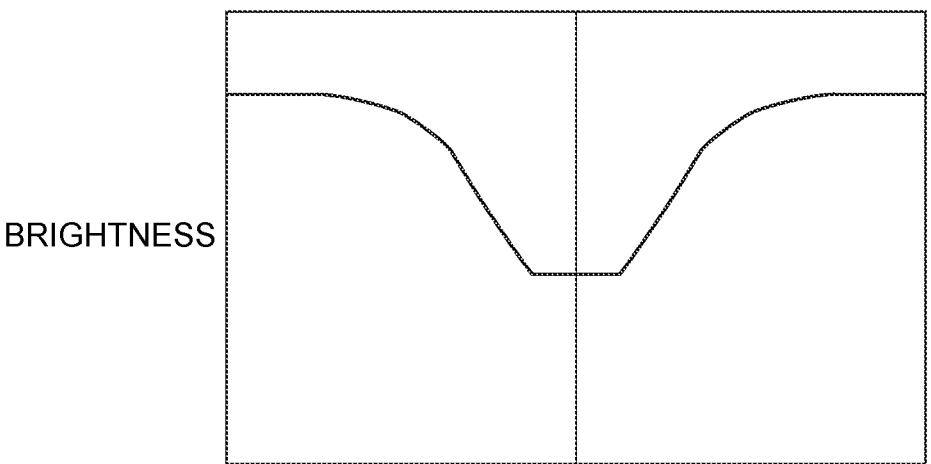
FIG. 18 is a graph illustrating the relation between the shift amount of an image of imaging light and brightness.

FIG. 18 is a graph illustrating the relation between the shift amount of an image of imaging light and brightness. This graph is a graph obtained when the filter 16 is used.

When the filter 16 is used, as illustrated in FIG. 17C, the area of the image $I_{Pb}'$ is smaller than the area of the image $I_{Pa}'$ and the area of the image $I_{Pc}'$. Furthermore, the area of the image $I_{Pa}'$ is equal to the area of the image $I_{Pc}'$.

Thus, in the image of the sample 8 illustrated in FIG. 7A, the brightness at the position Pb is darker than the brightness at the position Pa and the brightness at the position Pc. Furthermore, the brightness at the position Pa is equal to the brightness at the position Pc.

In the sample observation apparatus of the present embodiment, it is preferable that the first region be positioned outside the second region, and the second region be a circular region.

Figure 19:
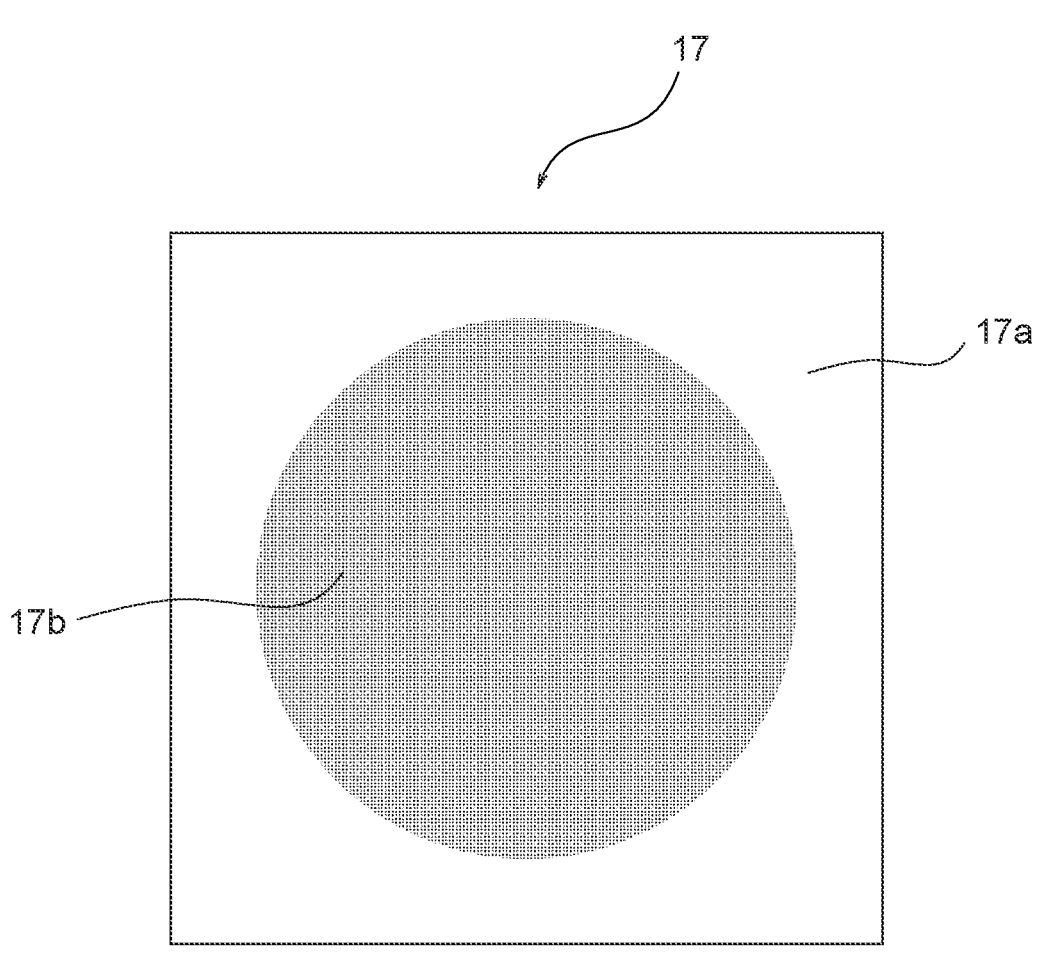
FIG. 19 is a diagram illustrating a fourth filter.

A fourth filter is described. FIG. 19 is a diagram illustrating the fourth filter. A filter 17 is used for generating an image corresponding to a dark-field image in a microscope (hereinafter referred to as "image $IS_{DAR}$").

The filter 17 includes a first region 17a and a second region 17b. The first region 17a is positioned outside the second region 17b. The second region 17b is a circular region. The size of the second region 17b is set based on the size of the image $I_{Light}$.

Each of the first region 17a and the second region 17b has a plurality of pixels. The range of values that can be set for a pixel is predetermined. The same value is set for each pixel in the first region 17a. The same value is also set for each pixel in the second region 17b.

However, the value set in the pixels in the first region 17a is different from the value set in the pixels in the second region 17b. The value set in the pixels in the first region 17a is greater than the value set in the pixels in the second region 17b.

Figure 20:
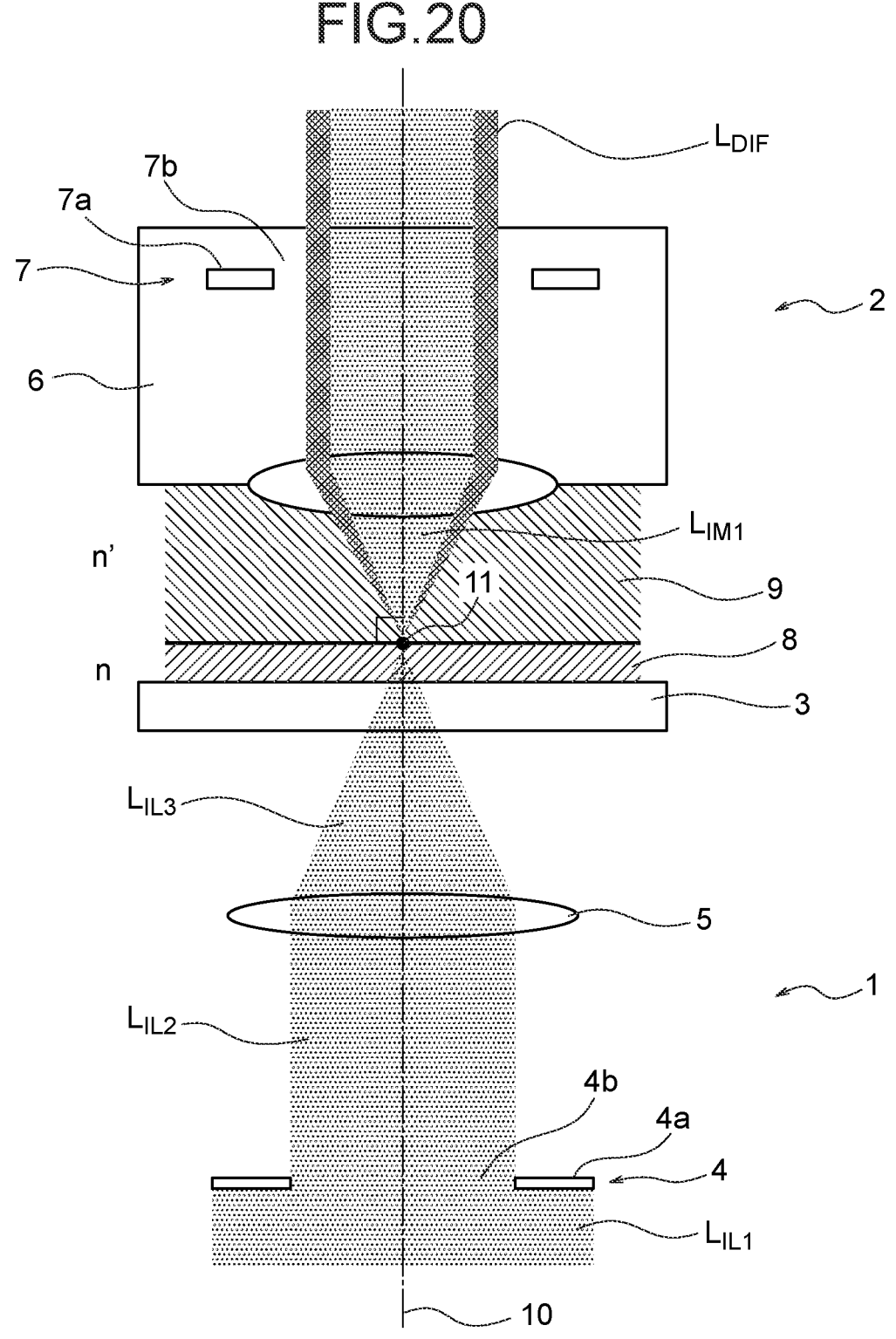
FIG. 20 is a diagram illustrating a state in which scattering light is produced.

FIG. 20 is a diagram illustrating a state in which scattering light is produced. When the sample 8 has a scattering surface or a scattering substance, the illumination light $L_{IL3}$ is scattered by the sample 8. As a result, scattering light is produced. The scattering light is produced in various directions.

Scattering light $L_{DIF}$ illustrated in FIG. 20 is scattering light at an angle greater than the angle determined by the numerical aperture of the imaging light $L_{IM1}$. The scattering light $L_{DIF}$ is positioned outside the imaging light $L_{IM1}$. In this case, the predetermined image includes the image $I_{Light}$ and an image of the scattering light.

The image of the scattering light is positioned outside the image $I_{Light}$. Then, the size of the second region 17b is substantially matched with the size of the image $I_{Light}$. Then, the product of the value of the predetermined image and the value of the filter 17 is obtained.

The product image includes the image $IS_{Light}$. However, the value set in the pixels in the second region 17b is smaller than the value set in the pixels in the first region 17a. Therefore, the image $IS_{Light}$ is removed from the product image. As a result, only the image corresponding to the image of the scattering light is obtained. The sum obtained from the value of this image represents the scattering light.

Even in dark-field observation with a microscope, it is possible to detect scattering light when the sample has a scattering surface or a scattering substance. Thus, by using the filter 17, it is possible to generate an image similar to a dark-field image in a microscope.

Although not illustrated in the drawings, the predetermined image used for generating the image $IS_{DAR}$ includes the image $I_{Pa}$, the image $I_{Pb}$, and the image $I_{Pc}$, similarly to the predetermined image illustrated in FIG. 9A. The image $I_{Pa}$, the image $I_{Pb}$, and the image $I_{Pc}$ in FIG. 9A are images obtained by the light spot 13 illustrated in FIG. 7A. This means that in the sample observation apparatus of the present embodiment, the illumination state is the same in generation of the image $IS_{DAR}$ and generation of the image $IS_{BRI}$. In this way, in the sample observation apparatus of the present embodiment, it is possible to generate the image $IS_{DAR}$ with the same illumination as the illumination used at a time of generating the image $IS_{BRI}$.

In the sample observation apparatus of the present embodiment, it is preferable that a phase film be disposed at the pupil position of the illumination optical system, the first region correspond to a region of an image of the phase film at a pupil position of the observation optical system, the second region be a region positioned inside the first region, and a region positioned outside the first region be a third region.

It is possible to use the filter 16 illustrated in FIG. 16 for generating an image corresponding to a phase-contrast image in a microscope (hereinafter referred to as "image $IS_{PHA}$").

As described above, in generation of the image $IS_{IVC}$, the position and the size of the first region 16a are set based on the size of the image $I_{Light}$. On the other hand, in generation of the image $IS_{PHA}$, the phase film is disposed at the pupil position of the illumination optical system. Therefore, the position and the size of the first region 16a are set based on the position and the size of the phase film.

An image of the phase film is formed at the pupil position of the observation optical system. Thus, the first region corresponds to a region of the image of the phase film at the pupil position of the observation optical system. Furthermore, the second region is a region positioned inside the first region. A region positioned outside the first region is the third region. The value in the first region is greater than the value in the third region.

AS just described, the filter 16 used for generating the image $IS_{IVC}$ is different from the filter 16 used for generating the image $IS_{PHA}$. In the following description, the filter 16 is used, but the filter 16 is an image used for generating the image $IS_{PHA}$.

Figure 21:
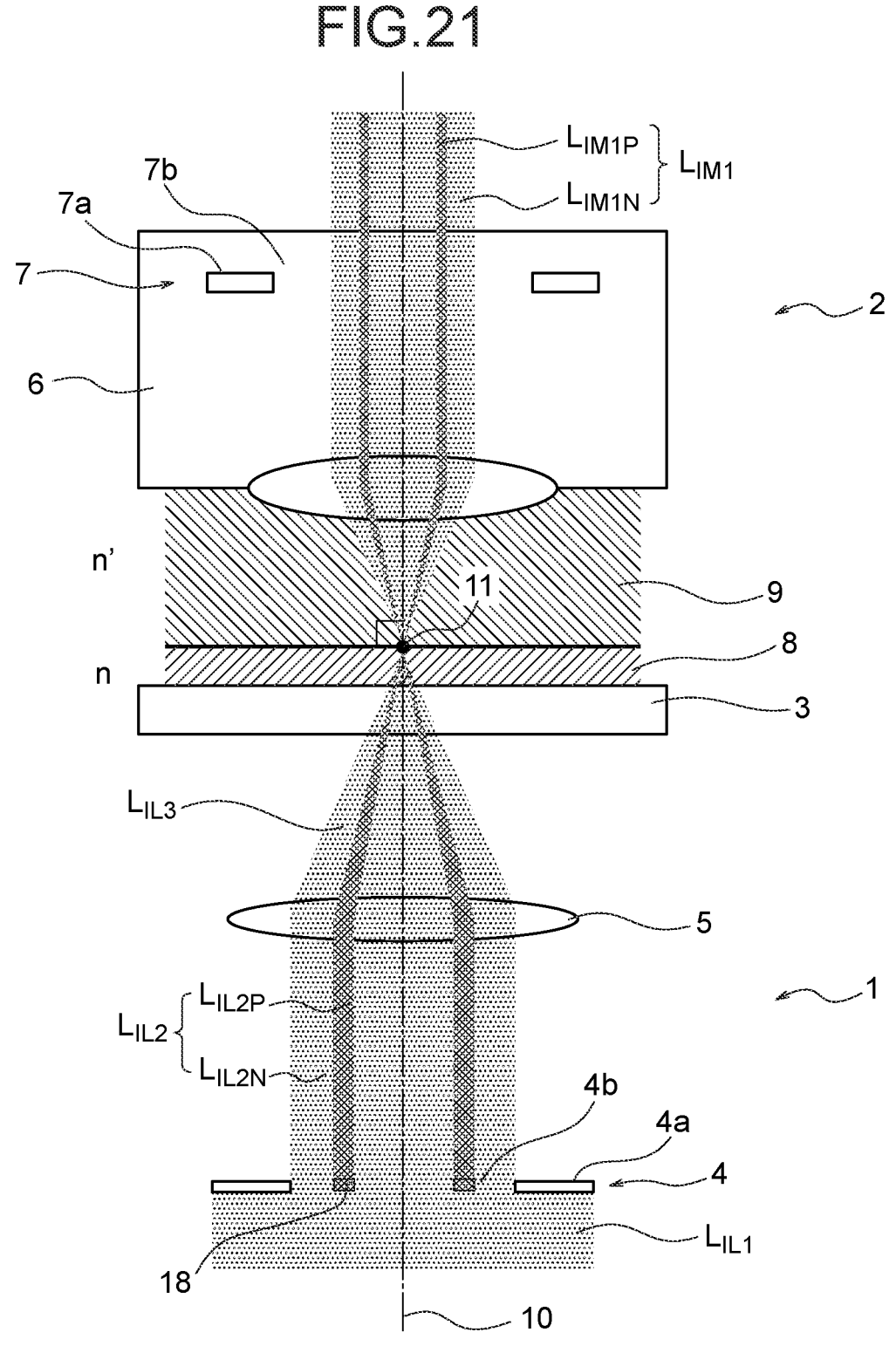
FIG. 21 is a diagram illustrating a state of illumination light and a state of imaging light when a phase film is disposed.

FIG. 21 is a diagram illustrating a state of illumination light and a state of imaging light when the phase film is disposed. The same configuration as that in FIG. 1 is denoted by the same numeral and a description thereof is omitted.

As illustrated in FIG. 21, a phase film 18 is disposed at the transmission region 4b. In this case, the illumination light $L_{IL2}$ includes illumination light $L_{IL2P}$ passing through the phase film 18 and illumination light $L_{IL2N}$ not passing through the phase film 18. In the illumination light $L_{IL2P}$, the phase is shifted by $\lambda/4$, compared with the illumination light $L_{IL2N}$.

The illumination light $L_{IL2}$ is incident on the condenser lens 5. Illumination light $L_{IL3}$ is emerged from the condenser lens 5. The illumination light $L_{IL3}$ is incident on the observation point 11 on the sample 8. The imaging light $L_{IM1}$ emerged from the observation point 11 reaches the objective lens 6.

The imaging light $L_{IM1}$ reaching the objective lens 6 is all incident on the objective lens 6. The imaging light $L_{IM1}$ incident on the objective lens 6 passes through the diaphragm 7. The imaging light $L_{IM1}$ includes imaging light $L_{IM1P}$ passing through the phase film 18 and imaging light $L_{IM1N}$ not passing through the phase film 18.

Figure 22A:
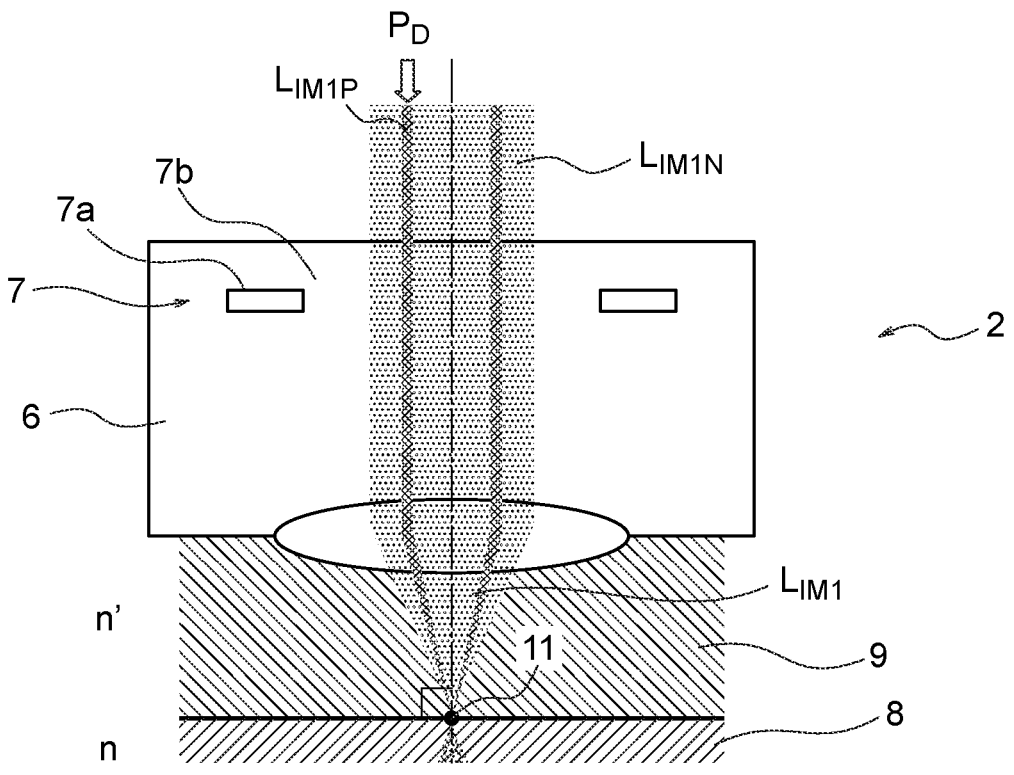
FIG. 22A is a diagram illustrating a state of imaging light of the 0th-order diffraction.
Figure 22B:
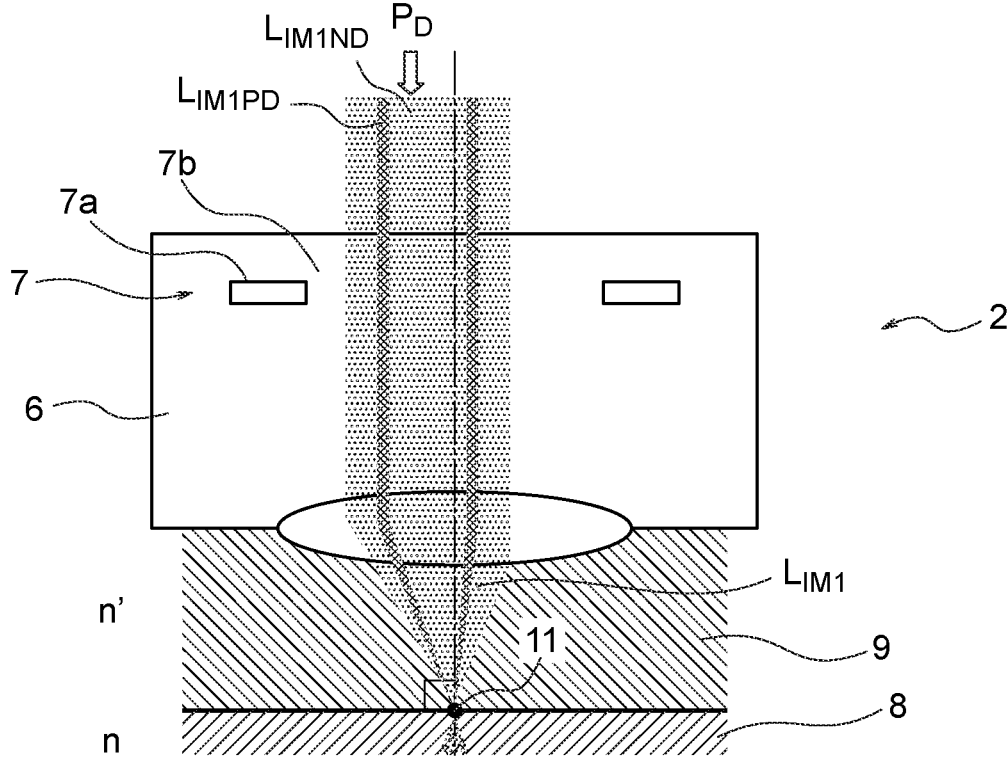
FIG. 22B is a diagram illustrating a state of imaging light of the 1st-order diffraction.

FIG. 22A is a diagram illustrating a state of imaging light of the 0th-order diffraction. FIG. 22B is a diagram illustrating a state of imaging light of the first-order diffraction.

Both of the imaging light $L_{IM1P}$ and the imaging light $L_{IM1N}$ are light not diffracted by the sample 8, that is, the 0th-order diffracted light. In the 0th-order diffracted light, the imaging light $L_{IM1P}$ reaches a position $P_D$. The imaging light $L_{IM1P}$ is light passing through the phase film 18. Thus, in the imaging light $L_{IM1P}$, the phase is shifted by 214, compared with the imaging light $L_{IM1N}$.

Both of the imaging light $L_{IM1PD}$ and the imaging light $L_{IM1ND}$ are light diffracted by the sample 8, for example, the first-order diffracted light. In the first-order diffracted light, the imaging light $L_{IM1ND}$ reaches the position $P_D$. The imaging light $L_{IM1ND}$ is light not passing through the phase film 18. However, it is diffracted by the sample 8. Thus, in the imaging light $L_{IM1ND}$, the phase is delayed by $\lambda/4$, compared with the imaging light $L_{IM1N}$.

The imaging light $L_{IM1P}$ and the imaging light $L_{IM1ND}$ simultaneously reach the position $P_D$. At the position $P_D$, the imaging light $L_{IM1P}$ and the imaging light $L_{IM1ND}$ interfere with each other. In this case, the phase difference between the imaging light $L_{IM1P}$ and the imaging light $L_{IM1ND}$ is $\lambda/2$ and therefore interfering light becomes dark. The brightness and darkness of interfering light is caused by change in phase.

When the shape of the phase film 18 is annular, a plurality of the same positions as the position $P_D$ occur. The same positions as the position $P_D$ are distributed in an annular shape. In the filter 16, the first region 16a is an annular region. Thus, the region of the first region 16a is determined such that the first region 16a includes the position $P_D$. By doing so, it is possible to detect brightness and darkness of interfering light.

The brightness and darkness of interfering light is caused by change in phase. It means that when the phase film and the filter 16 are used, it is possible to detect change in phase amount and the direction in which the phase changes, as change in brightness, if the sample is a colorless transparent object.

Even in phase-contrast observation with a microscope, when the sample is a colorless transparent object, it is possible to detect change in phase amount as change in brightness. Thus, by using the phase film and the filter 16, it is possible to generate an image similar to a phase-contrast image in a microscope.

The brightness of the first-order diffracted light is darker than the brightness of the 0th-order diffracted light. An absorption film is also provided in the phase film 18. The 0th-order diffracted light passes through the absorption film, whereby the brightness of the 0th-order diffracted light can be made substantially equal to the brightness of the first-order diffracted light. Thus, it is possible to make the contrast of interfering light high.

In phase-contrast observation with a microscope, the phase film is disposed at the objective lens, and a ring slit suitable for the phase film is disposed in the illumination optical system. The size of the phase film varies with the magnification of the objective lens. Therefore, in phase-contrast observation with a microscope, when the objective lens is replaced, replacement of the ring slit is sometimes required.

In comparison, in the sample observation apparatus of the present embodiment, the phase film is disposed in the illumination optical system. Therefore, the phase film need not be disposed at the objective lens. As a result, in the sample observation apparatus of the present embodiment, it is possible to use the objective lens for use in bright-field observation.

Furthermore, in the sample observation apparatus of the present embodiment, when the objective lens is replaced, the position and the size of the image of the phase film changes. Also in this case, it is only necessary to change the filter, for an image suitable for the position and the size of the image of the phase film.

In the sample observation apparatus of the present embodiment, it is preferable that the first region be determined by a brightness in a range of 3% or more and 30% or less of a maximum brightness, the maximum brightness be a maximum brightness in an image of the pupil of the illumination optical system, and the image of the pupil of the illumination optical system be formed at the pupil position of the observation optical system.

As described above, the position of the light-shielding member 4 is conjugate to the position of the diaphragm 7 by the condenser lens 5 and the objective lens 6. Thus, an image of the phase film 18 is formed at the position of the diaphragm 7. The first region 16a may be set based on the image of the phase film 18. The first region 16a is determined by a boundary between the first region 16a and the second region 16b (hereinafter referred to as "first boundary") and a boundary between the second region 16b and the third region 16c (hereinafter referred to as "second boundary").

It is possible to determine the first region by the brightness in a range of 3% or more and 30% or less of the maximum brightness. For example, a pixel having a value of 20% of the maximum brightness may be set as a pixel representing the first boundary and a pixel representing the second boundary.

The value of the pixel representing the first boundary and the value of the pixel representing the second boundary may be different. For example, a pixel having a value of 5% of the maximum brightness may be set as the pixel representing the first boundary, and a pixel having a value of 25% of the maximum brightness may be set as the pixel representing the second boundary.

The maximum brightness is the maximum brightness in the image of the pupil of the illumination optical system. The image of the pupil of the illumination optical system is formed at the pupil position of the observation optical system. Thus, the maximum brightness is the brightness at the pupil position of the observation optical system.

When the phase film 18 is disposed at the position of the light-shielding member 4, the image of the phase film 18 is formed at the pupil position of the observation optical system. Thus, the maximum brightness may be set based on the brightness of the image of the phase film 18.

When the brightness of the image of the phase film is not uniform, it is possible to set the first region with reference to the maximum brightness in the image of the phase film. For example, the two boundaries described above may satisfy the following condition:

$$0.03 \leq I/Imax \leq 0.3$$

where

I is the brightness at a point on the boundary, and

Imax is the maximum brightness in the image of the phase film.

In the sample observation apparatus of the present embodiment, it is preferable that image processing device change the filter in accordance with a relative position between the light spot and the holding member.

The phase-contrast observation method is one of observation methods suitable for observation of a living cell. Observation of a living cell is performed in a state in which a vessel is filled with a culture solution or a preservation solution.

Figure 23A:
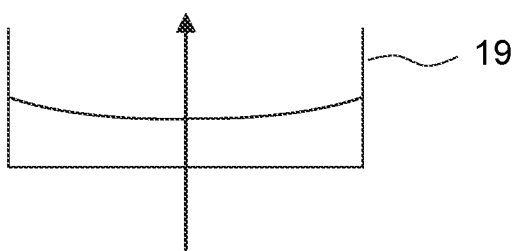
FIG. 23A is a diagram illustrating refraction of light at the middle of a vessel.
Figure 23B:
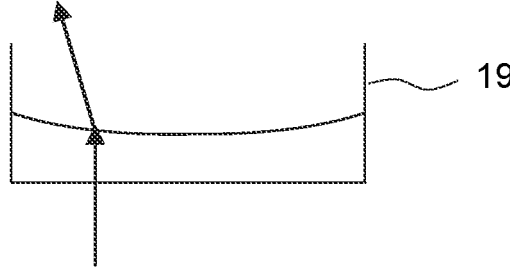
FIG. 23B is a diagram illustrating refraction of light in the periphery of the vessel.

FIG. 23A is a diagram illustrating refraction of light at the middle of a vessel. FIG. 23B is a diagram illustrating refraction of light in the periphery of the vessel. FIG. 23A and FIG. 23B illustrate a state in which light parallel to the optical axis passes through the vessel.

At the middle of a vessel 19, the solution surface is flat. At the middle of the vessel 19, light is emerged from the vessel 19 without being refracted.

When the area of the vessel 19 is small, even though the solution surface at the middle of the vessel 19 is flat, the solution surface is higher at the peripheral portion of the vessel 19 than at the middle. When the area of the vessel 19 is small, the solution surface is concave. Therefore, on the periphery of the vessel 19, light is refracted and emerged from the vessel 19.

When the light spot is positioned at the middle of the vessel 19, light is not refracted. Therefore, as illustrated in FIG. 22A, the imaging light $L_{IM1P}$ reaches the position $P_D$. On the other hand, when the light spot is positioned on the periphery of the vessel 19, light is refracted. In this case, the imaging light $L_{IM1P}$ does not reach the position $P_D$.

Therefore, in this state, it is possible to generate the image $IS_{PHA}$ with the sample positioned at the center, but it is not possible to generate the image $IS_{PHA}$ with the sample positioned on the periphery.

Then, the filter is changed in accordance with the relative position between the light spot and the holding member. For example, the shape and/or the position of the first region is changed. By doing so, it is possible to generate the $IS_{PHA}$ over the entire sample.

In the sample observation apparatus of the present embodiment, it is preferable that the image processing device include a plurality of filters, one filter be selected from among the filters in accordance with an observation method, and an image of the sample be generated using the selected filter.

As described above, by making region shapes and region positions different in the first region and the second region in the filter, it is possible to generate an image by various observation methods. Then, a plurality of filters are prepared in advance.

By doing so, it is possible to generate an image by a desired observation method by selecting one filter from among a plurality of filters in accordance with an observation method.

As used herein "in accordance with an observation method" means changing a filter in accordance with switching of observation methods such as bright-field observation, oblique illumination observation, inversion contrast observation, dark-field observation, and phase-contrast observation.

Figure 24:
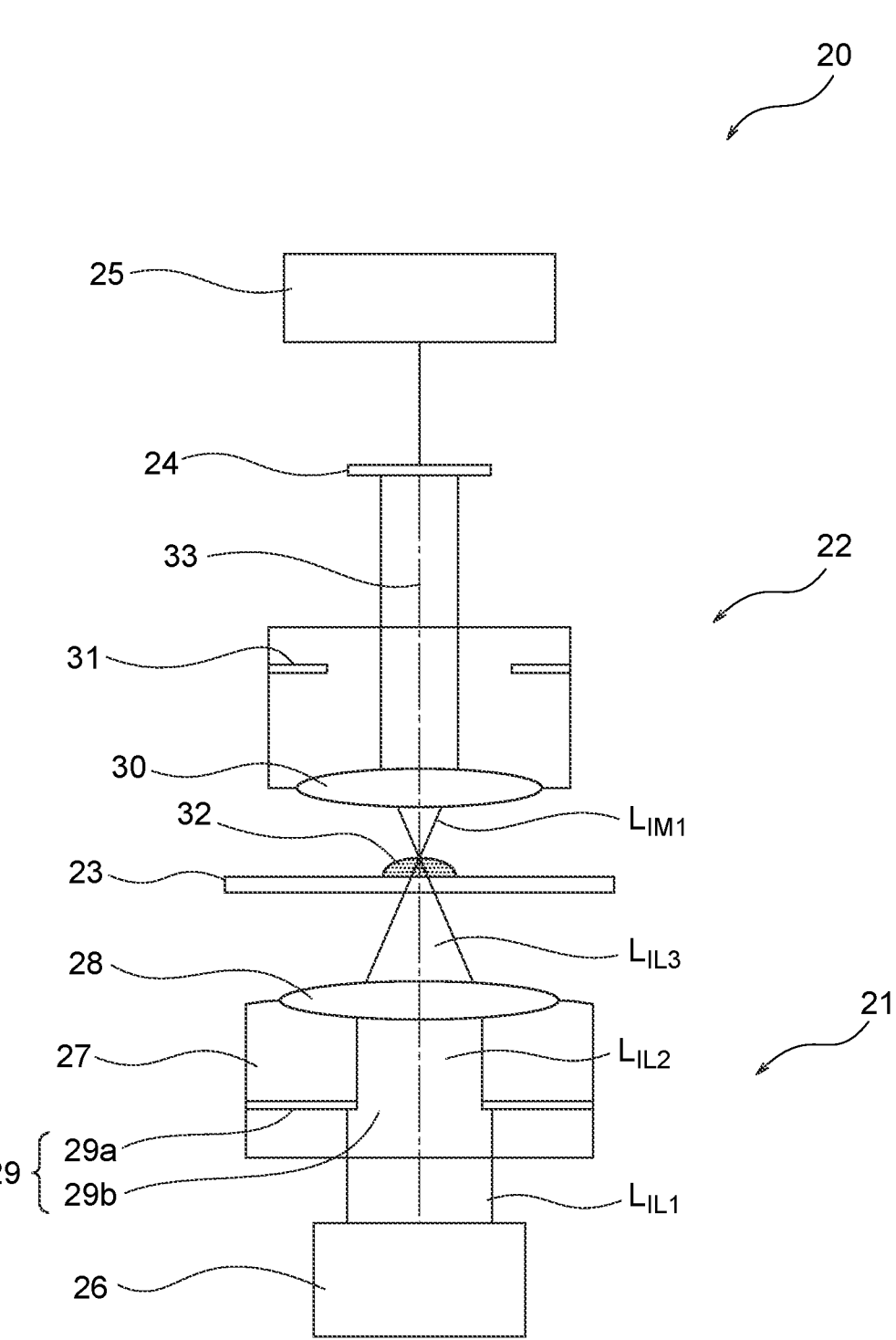
FIG. 24 is a diagram illustrating a configuration of a sample observation apparatus of the present embodiment.

The sample observation apparatus of the present embodiment is described. FIG. 24 is a diagram illustrating a configuration of the sample observation apparatus of the present embodiment. A sample observation apparatus 20 is, for example, an upright microscope and includes a light source 26, an illumination optical system 21, an observation optical system 22, a holding member 23, a detection element 24, and a processing device 25. The illumination optical system 21 includes a condenser 27. The observation optical system 22 includes an objective lens 30. A pupil 31 of the objective lens is positioned in the inside of the objective lens 30. The light source 26 is the light source unit. The detection element 24 is the light detection element.

The condenser 27 is provided with a condenser lens 28 and an aperture member 29. Here, the condenser lens 28 and the aperture member 29 are integrally held by the condenser 27. However, the condenser lens 28 and the aperture member 29 may be held separately. A metal plate is used for the aperture member 29.

Illumination light $L_{IL1}$ is emitted from the light source 26. The illumination light $L_{IL1}$ is a parallel light beam but may be a substantially parallel light beam. The illumination light $L_{IL1}$ emitted from the light source 26 is incident on the condenser 27. The illumination light $L_{IL1}$ is incident on the aperture member 29.

The aperture member 29 includes a light-shielding part 29a and a transmission part 29b. The size of the transmission part 29b is smaller than the beam diameter of the illumination light $L_{IL1}$. Therefore, a partial light beam of the illumination light $L_{IL1}$ is shielded by the light-shielding part 29a, and the remaining light beam passes through the transmission part 29*b*. Illumination light $L_{IL2}$ is emerged from the transmission part 29*b*. The size of the transmission part 29*b* may be the same as the beam diameter of the illumination light $L_{IL1}$.

The aperture member 29 is positioned closer to the light source 26 than the condenser lens 28. Then, the transmission part 29*b* is set such that the area of the region of illumination light that passes through the pupil of the observation optical system 22 is smaller than the area of the pupil of the observation optical system 22.

Illumination light $L_{IL2}$ is incident on the condenser lens 28. The illumination light $L_{IL2}$ is collected by the condenser lens 28. Illumination light $L_{IL3}$ is emerged from the condenser lens 28. The illumination light $L_{IL3}$ reaches the holding member 23.

The holding member 23 is disposed between the illumination optical system 21 and the observation optical system 22. A sample 32 is placed on the holding member 23. The sample 32 is held by the holding member 23.

The sample 32 is irradiated with the illumination light $L_{IL3}$ emerged from the illumination optical system 21. The illumination light $L_{IL3}$ irradiated with the sample 32 is transmitted through the sample 32. As a result, imaging light $L_{IM1}$ is emerged from the sample 32.

The imaging light $L_{IM1}$ emerged from the sample 32 is incident on the observation optical system 22. The imaging light $L_{IM1}$ is incident on the objective lens 30 and passes through the pupil 31 of the objective lens.

The imaging light $L_{IM1}$ passing through the pupil 31 of the objective lens is emerged from the observation optical system 22. The imaging light $L_{IM1}$ emerged from the observation optical system 22 is received by the detection element 24.

In this way, in the sample observation apparatus 20, light emitted from the light source 26 is incident on the illumination optical system 21. A light spot is formed by the illumination optical system 21. From the position where the light spot is formed, light is incident on the observation optical system 22. Light emerged from the observation optical system 22 is received by the detection element 24.

A signal from the detection element 24 is transmitted to the processing device 25. In the processing device 25, an image of the sample is generated based on the predetermined image and the filter as described above.

In the sample observation apparatus 20, when being emerged from the observation optical system 22, the imaging light $L_{IM1}$ is a parallel light beam, irrespective of the presence or absence of inclination of the surface of the sample 32. Then, when the surface of the sample 32 is inclined, the imaging light $L_{IM1}$ translates in a direction away from an optical axis 33.

Thus, the detection element 24 may be disposed at any position at which the imaging light $L_{IM1}$ is a parallel light beam. That is, the detection element 24 is not necessarily disposed at the pupil position of the observation optical system 22 or a position conjugate to the pupil position of the observation optical system 22.

In the sample observation apparatus 20, the area of the region of the imaging light $L_{IM1}$ is smaller than the area of the pupil 31 of the objective lens. Thus, even when the imaging light $L_{IM1}$ shifts in a direction away from the optical axis 33, the shape of the region of the imaging light $L_{IM1}$ does not change. That is, the shape of the region of the imaging light $L_{IM1}$ is the same between when the surface of the sample 32 is not inclined and when it is inclined.

In the sample observation apparatus of the present embodiment, it is preferable that the light detection element be configured with a plurality of photoconversion elements.

By doing so, it is possible to calculate the position of a predetermined illumination region. An example of the light detection element 24 is a CCD image sensor or a CMOS image sensor.

In the sample observation apparatus of the present embodiment, it is preferable that the light detection element be disposed at the pupil position of the observation optical system.

Figure 25:
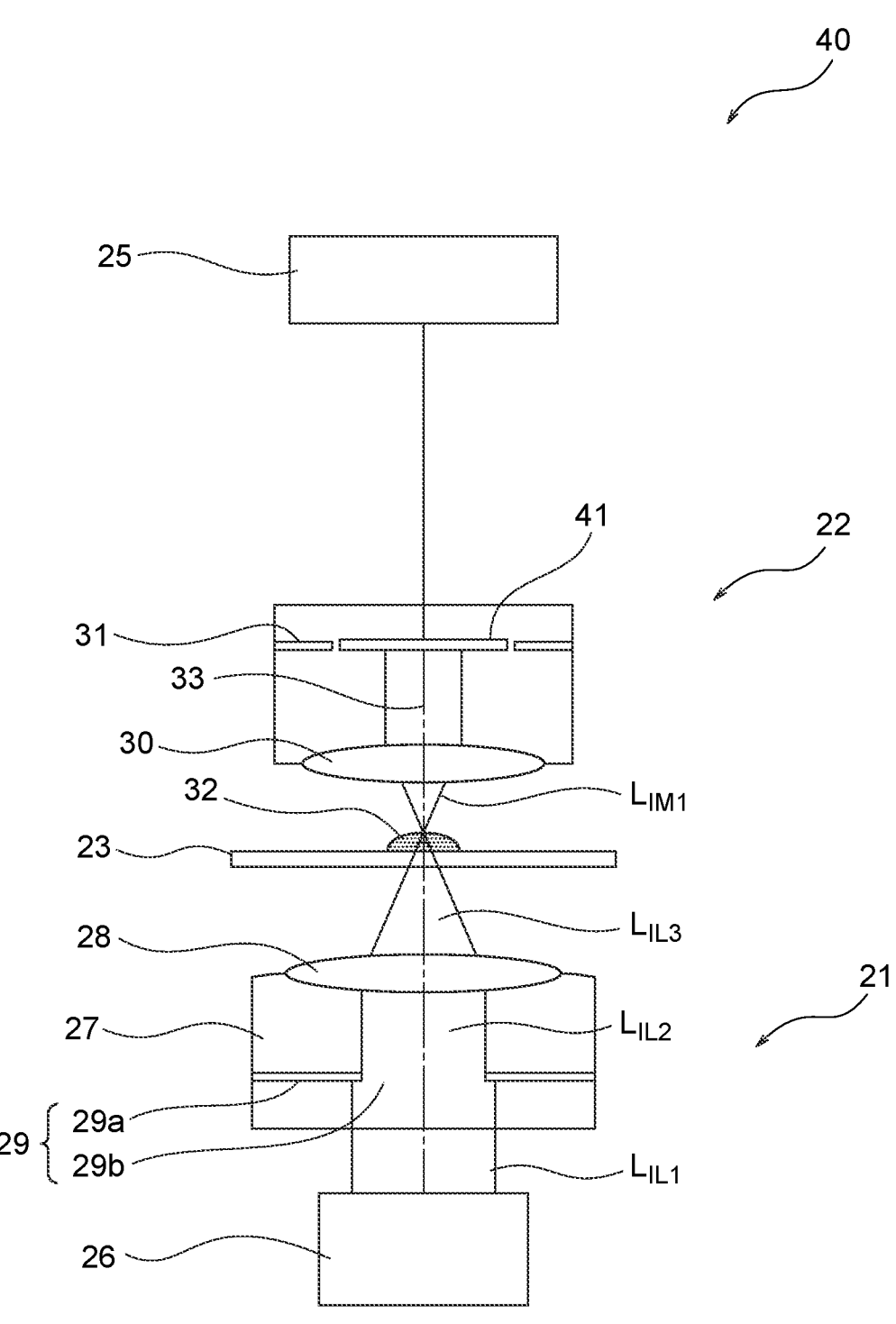
FIG. 25 is a diagram illustrating a configuration of the sample observation apparatus of the present embodiment.

FIG. 25 is a diagram illustrating a configuration of the sample observation apparatus of the present embodiment. The same configuration as that in FIG. 24 is denoted by the same numeral and a description thereof is omitted.

A sample observation apparatus 40 includes a detection element 41. The detection element 41 is the light detection element and disposed at the position of the pupil 31 of the objective lens. The pupil 31 of the objective lens is also the pupil of the observation optical system 22. Thus, in the sample observation apparatus 40, the detection element 41 is disposed at the pupil position of the observation optical system 22. Hence, it is possible to receive the imaging light $L_{IM1}$ at the pupil position of the observation optical system.

In the sample observation apparatus of the present embodiment, it is preferable that the light detection element be disposed at a position conjugate to the pupil of the observation optical system.

Figure 26:
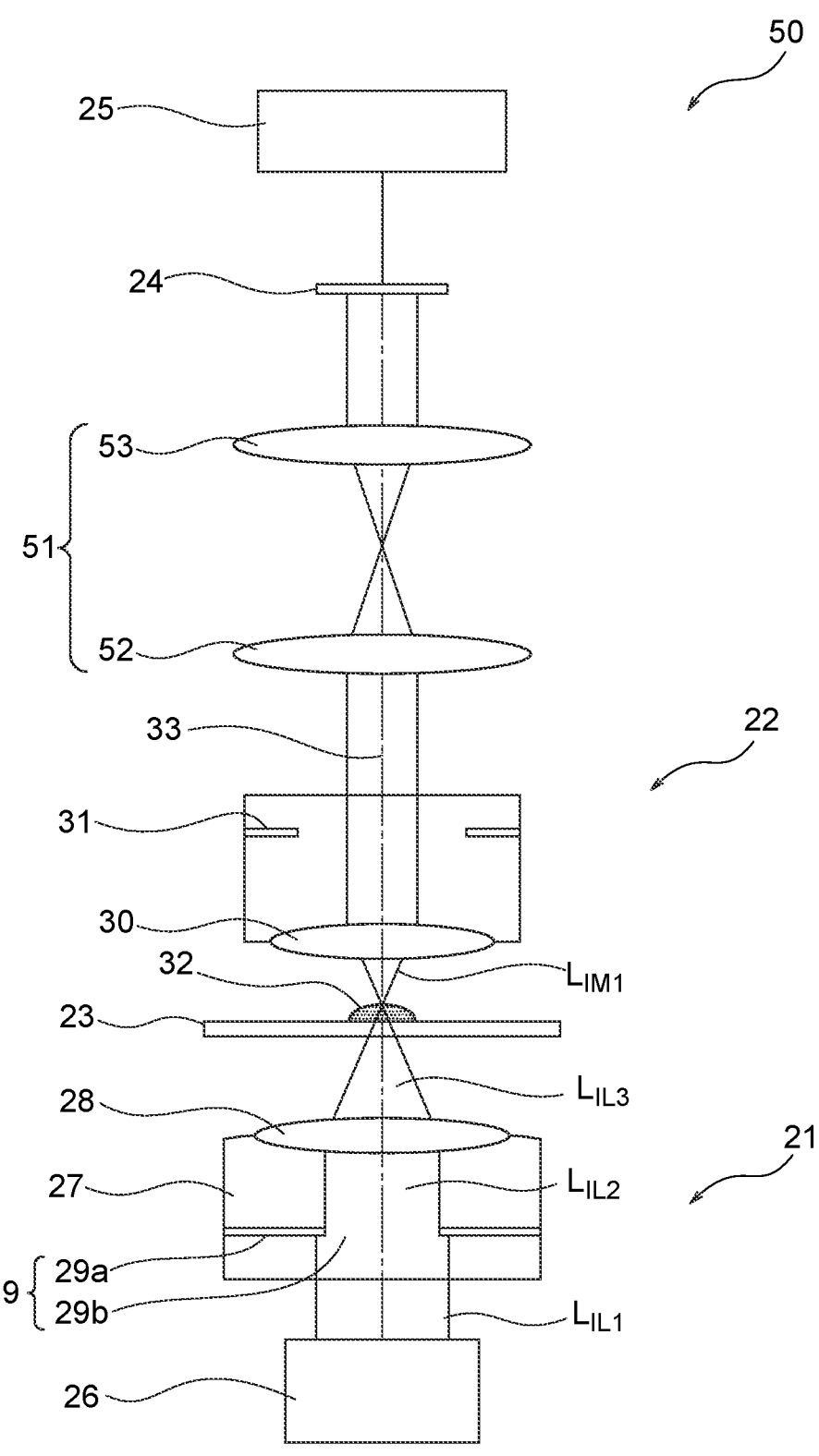
FIG. 26 is a diagram illustrating a configuration of the sample observation apparatus of the present embodiment.

FIG. 26 is a diagram illustrating a configuration of the sample observation apparatus of the present embodiment. The same configuration as that in FIG. 24 is denoted by the same numeral and a description thereof is omitted.

A sample observation apparatus 50 includes a relay optical system 51. The relay optical system 51 includes a lens 52 and a lens 53. An image of the pupil 31 of the objective lens is formed between the lens 52 and the processing device 25 by the lens 52 and the lens 53. The detection element 24 is disposed at an image position of the pupil 31 of the objective lens.

The image of the pupil 31 of the objective lens is also an image of the pupil of the observation optical system 22. Thus, in the sample observation apparatus 50, the detection element 24 is disposed at a position conjugate to the pupil of the observation optical system 22. Hence, it is possible to receive the imaging light $L_{IM1}$ at a position conjugate to the pupil of the observation optical system.

It is preferable that the sample observation apparatus of the present embodiment include a scanning unit that moves the light spot and the holding member relative to each other in a plane orthogonal to the optical axis. It is possible that the scanning unit be disposed between the light source unit and the position where the light spot is formed.

By doing so, it is possible to calculate information at a plurality of positions of the sample.

Figure 27:
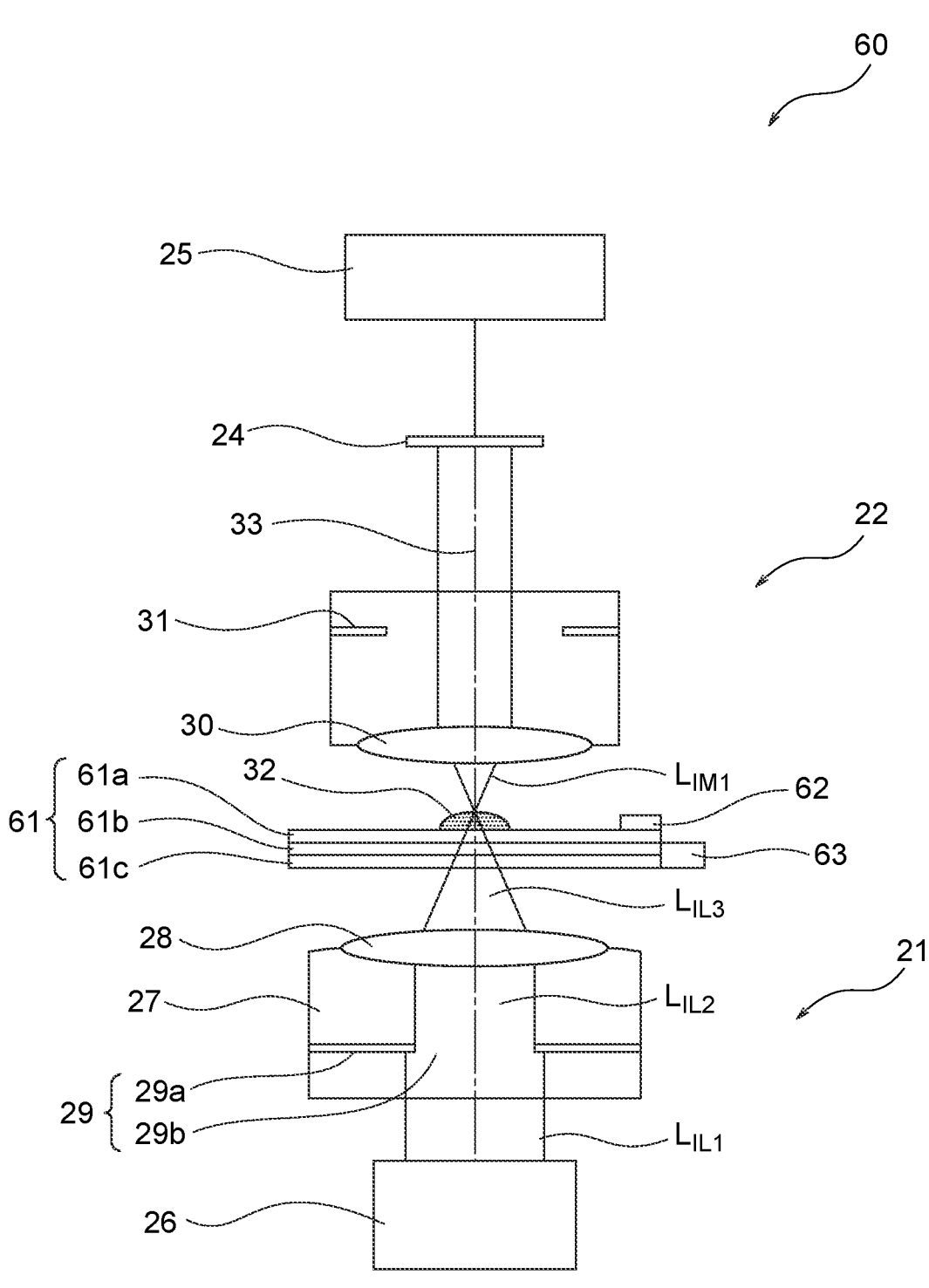
FIG. 27 is a diagram illustrating a configuration of the sample observation apparatus of the present embodiment.

FIG. 27 is a diagram illustrating a configuration of the sample observation apparatus of the present embodiment. The same configuration as that in FIG. 24 is denoted by the same numeral and a description thereof is omitted.

A sample observation apparatus 60 includes a scanning mechanism 61 as the scanning unit. The scanning mechanism 61 is configured with a first stage 61*a*, a second stage 61*b*, and a base 61*c*. The second stage 61*b* is positioned on the base 61*c*. The base 61*c* is provided with a mechanism for moving the second stage 61*b*. The first stage 61*a* is positioned on the second stage 61*b*. The second stage 61*b* is provided with a mechanism for moving the first stage 61*a*.

The first stage 61*a* and the second stage 61*b* move in directions orthogonal to each other. For example, the first stage 61*a* moves in the left-right direction in the drawing sheet, and the second stage 61*b* moves in the direction orthogonal to the drawing sheet. By doing so, it is possible to make relative movement of illumination light and the sample by moving the sample.

In the sample observation apparatus 60, the illumination light $L_{IL3}$ is always collected on the optical axis 33. Then, the sample 32 is placed on the first stage 61*a*, and the first stage 61*a* and the second stage 61*b* are moved. By doing so, various places of the surface of the sample 32 traverse the light collection point of the illumination light $L_{IL3}$. As a result, it is possible to calculate information at a plurality of positions of the sample 32.

The movement of the first stage 61*a* and the movement of the second stage 61*b* can be performed manually but preferably performed electrically. By electrically moving the stages, it is possible to move and position the stages fast and accurately. Based on this, in the sample observation apparatus 60, a first driving element 62 and a second driving element 63 are provided in the scanning mechanism 61. An example of the first driving element 62 and the second driving element 63 is a stepping motor.

The first driving element 62 is provided at the second stage 61*b*. It is possible to move the first stage 61*a* by the first driving element 62. The second driving element 63 is provided at the base 61*c*. It is possible to move the second stage 61*b* by the second driving element 63.

Even in the sample observation apparatus 60, when being emerged from the observation optical system 22, the imaging light $L_{IM1}$ is a parallel light beam, irrespective of the presence or absence of inclination of the surface of the sample 32. Then, when the surface of the sample 32 is inclined, the imaging light $L_{IM1}$ translates in a direction away from the optical axis 33.

Thus, the detection element 24 may be disposed at any position at which the imaging light $L_{IM1}$ is a parallel light beam. That is, the detection element 24 is not necessarily disposed at the pupil position of the observation optical system 22 or a position conjugate to the pupil position of the observation optical system 22.

In the sample observation apparatus of the present embodiment, it is preferable that the scanning unit include a driving device that moves the illumination light.

Figure 28:
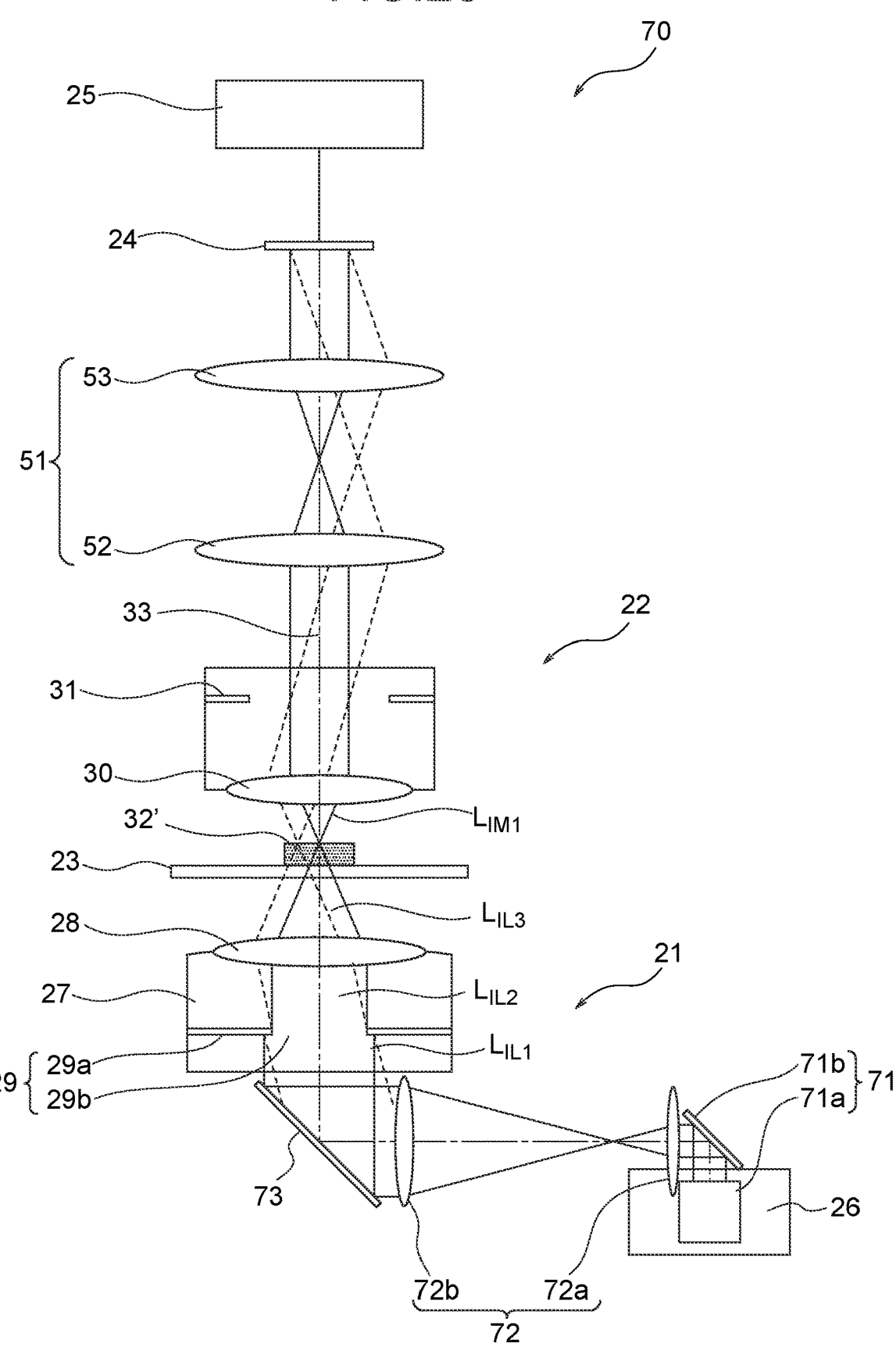
FIG. 28 is a diagram illustrating a configuration of the sample observation apparatus of the present embodiment.

FIG. 28 is a diagram illustrating a configuration of the sample observation apparatus of the present embodiment. The same configuration as that in FIG. 26 is denoted by the same numeral and a description thereof is omitted.

A sample observation apparatus 70 includes a scanning mechanism 71 as the scanning unit. The scanning mechanism 71 is configured with a first optical deflection element and a second optical deflection element. Examples of the first optical deflection element and the second optical deflection element include a galvano scanner, a polygon mirror, and an acousto-optic deflector (AOD).

In the sample observation apparatus 70, a galvano scanner is used for each of the first optical deflection element and the second optical deflection element. In FIG. 28, a first galvano scanner mirror (hereinafter referred to as "first mirror 71*a*") and a second galvano scanner mirror (hereinafter referred to as "second mirror 71*b*") are illustrated.

Illumination light $L_{IL1}$ emitted from the light source 26 is incident on the first mirror 71*a*. The illumination light $L_{IL1}$ is reflected by the first mirror 71*a*. Subsequently, the illumination light $L_{IL1}$ is incident on the second mirror 71*b*. The illumination light $L_{IL1}$ is reflected by the second mirror 71*b*.

In the first optical deflection element, deflection of the illumination light $L_{IL1}$ is carried out by changing the orientation of the first mirror 71*a*. In the second optical deflection element, deflection of the illumination light $L_{IL1}$ is carried out by changing the orientation of the second mirror 71*b*.

The first optical deflection element is disposed such that the axis of rotation is parallel to the drawing sheet. The second optical deflection element is disposed such that the axis of rotation is vertical to the drawing sheet. Thus, by changing the orientation of the first mirror 71*a* and the orientation of the second mirror 71*b*, the illumination light $L_{IL1}$ is deflected in two directions orthogonal to each other. By doing so, it is possible to make relative movement of the illumination light and the sample by moving the illumination light.

The Illumination light $L_{IL1}$ emerged from the second optical deflection element is incident on a relay optical system 72. The relay optical system 72 is an afocal optical system. The relay optical system 72 is configured with a lens 72*a* and a lens 72*b*. The illumination light $L_{IL1}$ emerged from the relay optical system 72 is reflected by a mirror 73 and thereafter incident on the condenser 27.

A not-illustrated relay optical system is disposed between the first mirror 71*a* and the second mirror 71*b*. With the relay optical system, the position of the first mirror 71*a* and the position of the second mirror 71*b* are conjugate.

The position of the second mirror 71*b* is conjugate to the position of the pupil of the illumination optical system 21 by the relay optical system 72. Thus, deflection of the illumination light $L_{IL1}$ can be considered to be performed at the position of the transmission part 29*b*. In FIG. 28, the deflected illumination light $L_{IL1}$ is denoted by a dotted line.

In the sample observation apparatus 70, the position of a sample 32' is fixed. Then, the orientation of the first mirror 71*a* and the orientation of the second mirror 71*b* are changed. By doing so, the light collection point of the illumination light $L_{IL3}$ traverses various places of the surface of the sample 32'. As a result, it is possible to calculate information at a plurality of positions of the sample 32'.

In the sample observation apparatus 70, the optical axis 33 or a position at a distance from the optical axis 33 (hereinafter referred to as "off-axis position") is irradiated with the illumination light $L_{IL3}$.

When the illumination light $L_{IL3}$ is irradiated on the optical axis 33, as depicted by a solid line, the imaging light $L_{IM1}$ is emerged from the optical axis 33. When the surface of the sample 32 is not inclined, this imaging light $L_{IM1}$ does not intersect the optical axis 33. Therefore, the center of the imaging light $L_{IM1}$ is coincident with the optical axis 33 of the objective lens 30 at any position on the optical axis 33, on the detection element 24 side of the objective lens 30.

On the other hand, when the illumination light $L_{IL3}$ is irradiated on an off-axis position, as denoted by a broken line, the imaging light $L_{IM1}$ is emerged from the off-axis position. This imaging light $L_{IM1}$ intersects the optical axis 33 even when the surface of the sample 32' is not inclined. Therefore, the center of the imaging light $L_{IM1}$ is not coincident with the optical axis 33 at some positions on the optical axis 33, on the detection element 24 side of the objective lens 30. If the detection element 24 is disposed at such a position, the calculated information is incorrect.

Based on this, in the sample observation apparatus 70, it is preferable that the detection element 24 be disposed at the pupil position of the observation optical system 22 or a position conjugate to the pupil position of the observation optical system 22. At the pupil position or the position conjugate to the pupil position, even when the surface of the sample 32' is not inclined, the center of the imaging light $L_{IM1}$ emerged from the off-axis position is coincident with the optical axis 33. Thus, it is possible to calculate accurate information.

When the relay optical system 72 is disposed between the first mirror 71a and the second mirror 71b, the position of the first mirror 71a, the position of the second mirror 71b, and the position of the pupil of the illumination optical system 21 are conjugate. In this case, deflection by the first mirror 71a and deflection by the second mirror 71b can be considered to be performed at the position of the pupil of the illumination optical system 21.

Thus, as illustrated in FIG. 28, the center of the imaging light $L_{IM1}$ emerged from the optical axis 33 and the center of the imaging light $L_{IM1}$ emerged from the off-axis position are coincident with the optical axis 33 at the position of the detection element 24.

The relay optical system 72 is not necessarily disposed between the first mirror 71a and the second mirror 71b. In this case, the first mirror 71a and the second mirror 71b are disposed in proximity.

In the case where two mirrors are disposed in proximity, if the relay optical system 72 makes the position of the second mirror 71b conjugate to the position of the pupil of the illumination optical system 21, the position of the first mirror 71a and the position of the pupil of the illumination optical system 21 are not conjugate.

In this case, deflection by the second mirror 71b is performed at the position of the pupil of the illumination optical system 21. However, deflection by the first mirror 71a is performed at a position shifted from the position of the pupil of the illumination optical system 21. Therefore, at the position of the detection element 24, the center of the imaging light $L_{IM1}$ emerged from the optical axis 33 coincides with the optical axis 33, but the center of the imaging light $L_{IM1}$ emerged from the off-axis position does not coincide with the optical axis 33.

The amount of displacement between the position of the imaging light $L_{IM1}$ emerged from the off-axis position and the optical axis 33 changes in accordance with a deflection angle. The change in deflection angle is change in relative position between the light spot and the holding member.

As just described, in the sample observation apparatus of the present embodiment, it is possible to change the filter in accordance with the relative position between the light spot and the holding member. Thus, even when two mirrors are disposed in proximity, it is possible to calculate accurate information.

In the sample observation apparatus of the present embodiment, it is preferable that the illumination optical system include an optical member between the light source and the condenser lens, and the optical member be configured with a lens.

Figure 29:
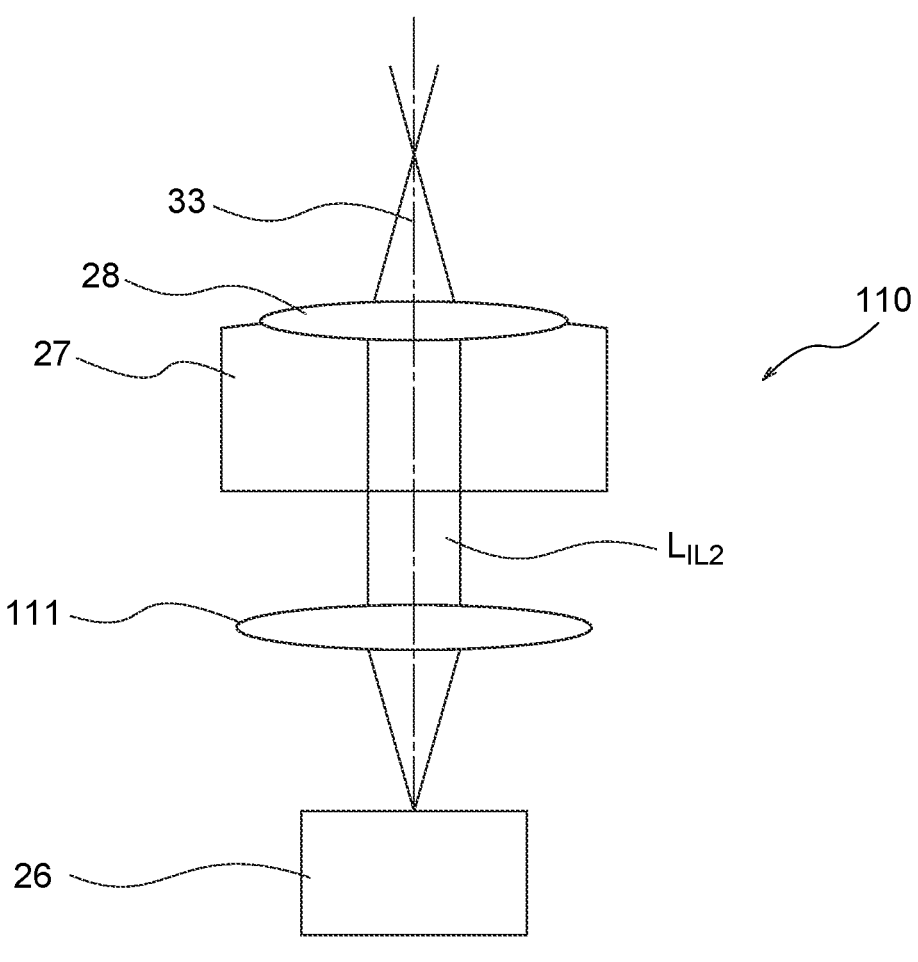
FIG. 29 is a diagram illustrating an example of an illumination optical system.

FIG. 29 is a diagram illustrating an example of the illumination optical system. The same configuration as that in FIG. 24 is denoted by the same numeral and a description thereof is omitted.

An illumination optical system 110 includes an optical member between the light source 26 and the condenser lens 28. The optical member is configured with a lens 111. The light source 26 is a point light source. The light source 26 and the lens 111 are positioned such that the focus position of the lens 111 is coincident with a light-emitting point of the light source 26.

In the sample observation apparatus 20 illustrated in FIG. 24, the aperture member 29 is disposed between the light source 26 and the condenser lens 28. Then, the aperture member 29 is irradiated with illumination light $L_{IL1}$. At this moment, the irradiation area of the illumination light $L_{IL1}$ is larger than the area of the transmission part 29b. Therefore, a light loss of illumination light occurs in the aperture member 29.

By making the irradiation area of the illumination light $L_{IL1}$ substantially equal to the area of the transmission part 29b, it is possible to prevent the light loss of illumination light. In addition, it is possible to eliminate the arrangement of the aperture member 29.

In the illumination optical system 110, the focus position of the lens 111 is set so as to be matched with the diameter of the illumination light $L_{IL2}$. Therefore, the light loss of illumination light does not occur and, in addition, the aperture member is not required. Furthermore, by changing the focus position of the lens 111, it is possible to change the diameter of the illumination light $L_{IL2}$.

In the illumination optical system 110, another lens may further be disposed between the light source 26 and the lens 111. In this case, an image of the point light source is formed by the other lens. Then, light emitted from the image of the point light source may be converted by the lens 111 into a parallel light beam.

Furthermore, an afocal zoom optical system may be disposed between the lens 111 and the condenser 27. By doing so, it is possible to change the diameter of the illumination light $L_{IL2}$.

In the sample observation apparatus of the present embodiment, it is preferable that the light source be a laser light source, and the illumination optical system include an optical fiber between the light source and the optical member.

Figure 30:
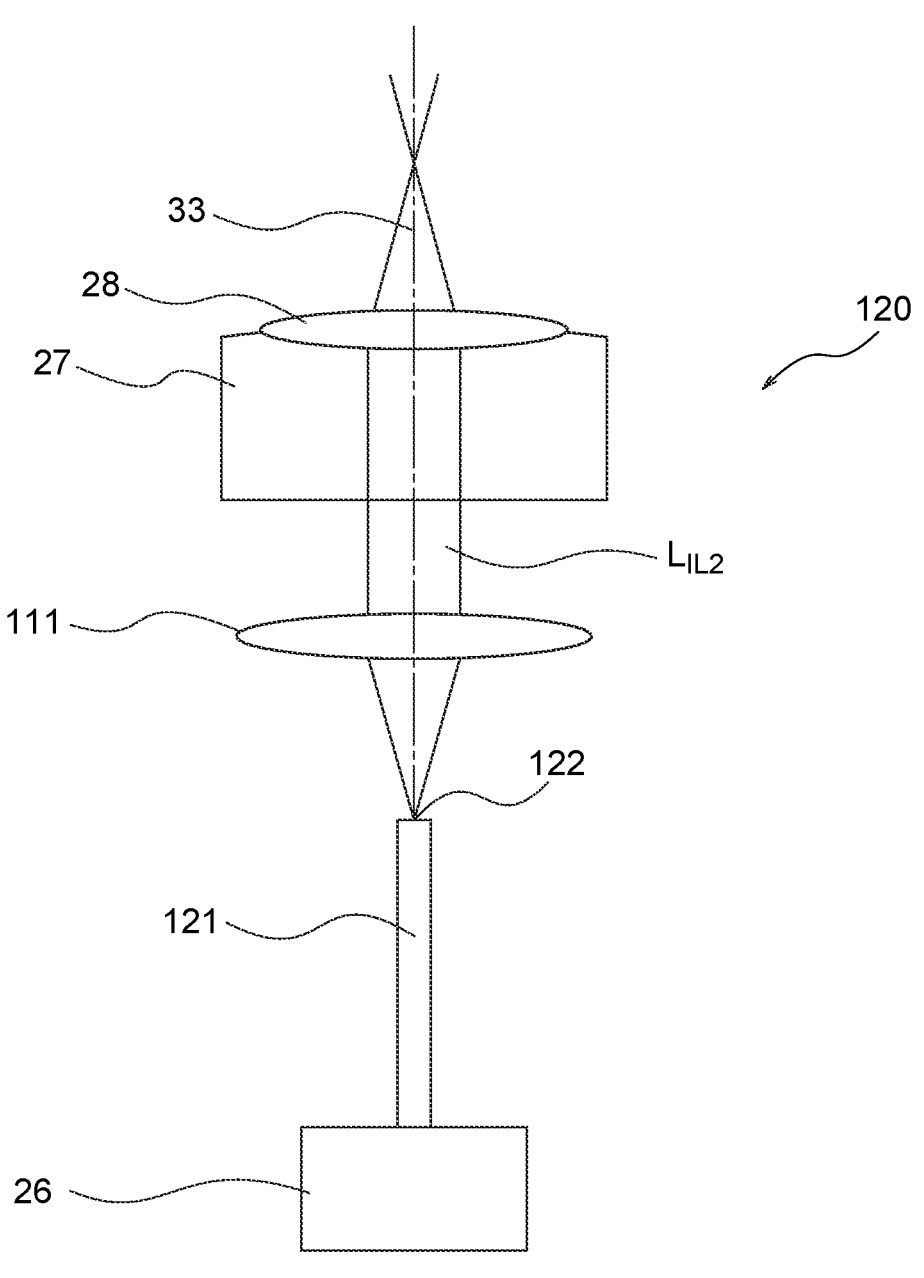
FIG. 30 is a diagram illustrating another example of the illumination optical system.

FIG. 30 is a diagram illustrating another example of the illumination optical system. The same configuration as that in FIG. 29 is denoted by the same numeral and a description thereof is omitted.

An illumination optical system 120 includes an optical member between the light source 26 and the condenser lens 28. The optical member is configured with the lens 111. Furthermore, laser light emitted from the light source 26 is incident on an optical fiber 121. The laser light propagates in the optical fiber 121 and is emerged from an output end 122 of the optical fiber 121.

When the optical fiber 121 is a single-mode fiber, a point light source is formed at the output end 122. Then, the output end 122 and the lens 111 are positioned such that the focus position of the lens 111 is coincident with the output end 122. As a result, it is possible to achieve the same effect as in the illumination optical system 110 described above.

In the illumination optical system 120, another lens may be further disposed between the optical fiber 121 and the lens 111. In this case, an image of the point light source is formed by the other lens. Then, light emerged from the image of the point light source may be converted by the lens 111 into a parallel light beam.

Furthermore, an afocal zoom optical system may be disposed between the lens 111 and the condenser 27. By doing so, it is possible to change the diameter of the illumination light $L_{IL2}$.

(Appendix Mode 1)

The scanning unit is disposed between the light source unit and a position where the light spot is formed.

(Appendix Mode 2)

A filter different from the filter is included, the other filter includes a first region and a second region, a shape of the first region differs between the filter and the other filter, and a shape of the second region differs between the filter and the other filter.

According to the present disclosure, it is possible to provide a sample observation apparatus capable of readily generating an image by various observation methods.

As described above, the present disclosure is suitable for a sample observation apparatus capable of readily generating an image by various observation methods.

What is claimed is:

1. A sample observation apparatus comprising:

a light source;

an illumination optical system including at least one first lens, light from the light source exits the at least one first lens and is incident on a sample as a light spot;

an observation optical system including at least one second lens, light from the sample is incident on the at least one second lens;

a holding member that holds the sample;

an image sensor that is located at a pupil of the observation optical system or at a position which is conjugate to a pupil of the observation optical system, wherein the pupil of the observation optical system is located at a conjugate position to a pupil of the illumination optical system, and the image sensor is configured to output first image data of the pupil of the observation optical system formed by light emitted from the light spot;

a scanning mechanism that changes a relative position between the light spot on the sample and the holding member such that the image sensor obtains a plurality of the first image data corresponding to a plurality of positions of the sample; and a processor comprising hardware, the processor having a filter image in which a value indicating brightness is set for each pixel;

wherein the filter image includes a first region and a second region, and pixel values indicating brightness in the first region are greater than pixel values indicating brightness in the second region;

each pixel of the filter image corresponds to each pixel of the first image data;

the processor being configured to generate a plurality of second image data by calculating, for each of the plurality of first image data, a product of pixel values of the first image data and the corresponding pixel values of the filter image and to generate image data of the sample based on the plurality of second image data.

2. The sample observation apparatus according to claim 1, wherein the first region is a circular region, and the second region is positioned outside the first region.

3. The sample observation apparatus according to claim 1, wherein the first region is a semi-circular region, and the second region is positioned outside the first region.

4. The sample observation apparatus according to claim 1, wherein the filter includes a third region, the first region is an annular region, the second region is positioned outside the first region, and the third region is positioned inside the first region.

5. The sample observation apparatus according to claim 1, wherein the first region is positioned outside the second region, and the second region is a circular region.

6. The sample observation apparatus according to claim 1, further comprising a phase film disposed at the pupil position of the illumination optical system, wherein the first region corresponds to a region of an image of the phase film at the pupil position of the observation optical system, the second region is a region positioned inside the first region, and a region positioned outside the first region is a third region.

7. The sample observation apparatus according to claim 6, wherein the first region is determined by a brightness in a range of 3% or more and 30% or less of a maximum brightness, the maximum brightness is a maximum brightness in an image of the pupil of the illumination optical system, and the image of the pupil of the illumination optical system is formed at the pupil position of the observation optical system.

8. The sample observation apparatus according to claim 1, wherein the processor changes a filter for producing the filter image in accordance with the relative position between the light spot and the holding member.

9. The sample observation apparatus according to claim 1, wherein the processor has a plurality of filters for producing the filter image, and a filter is selected from among the plurality of filters in accordance with an observation method.

10. The sample observation apparatus according to claim 1, wherein the scanning mechanism is selected from a group consisting of a stage, a galvano scanner, a polygon mirror, and an acousto-optic deflector.

11. The sample observation apparatus according to claim 1, wherein the processor is configured to calculate a total value obtained by summing pixel values of each of the plurality of second image data, and to generate the image data of the sample based on the total value.

* * * * *